US009756706B2

(12) United States Patent
Breuer et al.

(10) Patent No.: US 9,756,706 B2
(45) Date of Patent: Sep. 5, 2017

(54) CONTROLLING A SYSTEM THAT INCLUDES LIGHT-BASED COMMUNICATION (LCOM)-ENABLED LUMINAIRES

(71) Applicants: Christian Breuer, Newburyport, MA (US); Anant Aggarwal, Waltham, MA (US); Barry Stout, Beverly, MA (US)

(72) Inventors: Christian Breuer, Newburyport, MA (US); Anant Aggarwal, Waltham, MA (US); Barry Stout, Beverly, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 14/668,689

(22) Filed: Mar. 25, 2015

(65) Prior Publication Data
US 2015/0282282 A1    Oct. 1, 2015

Related U.S. Application Data

(60) Provisional application No. 61/970,317, filed on Mar. 25, 2014, provisional application No. 61/970,327, filed on Mar. 25, 2014.

(51) Int. Cl.
*H05B 37/02* (2006.01)
*G08C 17/02* (2006.01)
(Continued)

(52) U.S. Cl.
CPC ......... *H05B 37/0272* (2013.01); *G08C 17/02* (2013.01); *H04B 10/116* (2013.01);
(Continued)

(58) Field of Classification Search
CPC ............ H05B 37/0209; H05B 37/0218; H05B 37/0227; H05B 37/0236; H05B 37/0245;
(Continued)

(56) References Cited

U.S. PATENT DOCUMENTS

2005/0281549 A1* 12/2005 Shih .................. G03B 7/08
  396/57
2008/0265799 A1* 10/2008 Sibert ............... H05B 37/0245
  315/292

(Continued)

OTHER PUBLICATIONS

Lux Meter (description of application). Apr. 24, 2013 https://play.google.com/store/apps/details?id=com.notquitethem.android.luxmeter#details-reviews.*

*Primary Examiner* — Alexander H Taningco
*Assistant Examiner* — Renan Luque
(74) *Attorney, Agent, or Firm* — Yutian Ling

(57) ABSTRACT

Techniques are disclosed for controlling a system including one or more light-based communication (LCom)-enabled luminaires. In some cases, the system may include: one or more LCom-enabled luminaires; a light sensor configured to detect LCom signals emitted from the luminaires; a computing device operatively coupled to the light sensor and configured to decode data from the LCom signals; and a controller configured to control the light output from at least one of the luminaires. The techniques may include calibrating, detecting, or otherwise setting up the system, such that the computing device knows at least one of the unique identification and position of each luminaire in the system. Once the initial set up is completed, the system can be controlled in a number of ways, such as manually or automatically controlling the light output from the luminaires for various applications, such as providing ambient light that complements video or audio content.

19 Claims, 13 Drawing Sheets

(51) Int. Cl.
*H04B 10/116* (2013.01)
*H04M 1/725* (2006.01)
*H04L 29/12* (2006.01)
*H04W 84/12* (2009.01)

(52) U.S. Cl.
CPC .... *H04M 1/72533* (2013.01); *H05B 37/0218* (2013.01); *H05B 37/0236* (2013.01); *G08C 2201/93* (2013.01); *H04L 61/2007* (2013.01); *H04L 61/6022* (2013.01); *H04W 84/12* (2013.01)

(58) Field of Classification Search
CPC .............. H05B 37/038; H05B 33/0854; H05B 37/0281; H04B 10/116
USPC .......................................... 315/151; 398/118
See application file for complete search history.

(56) References Cited

U.S. PATENT DOCUMENTS

| | | | | |
|---|---|---|---|---|
| 2012/0091896 | A1* | 4/2012 | Schenk | H05B 37/0245 315/132 |
| 2012/0200226 | A1* | 8/2012 | Knibbe | H04B 10/1149 315/151 |
| 2014/0354160 | A1* | 12/2014 | Aggarwal | H05B 37/0227 315/152 |
| 2014/0375217 | A1* | 12/2014 | Feri | H05B 37/0272 315/151 |

* cited by examiner

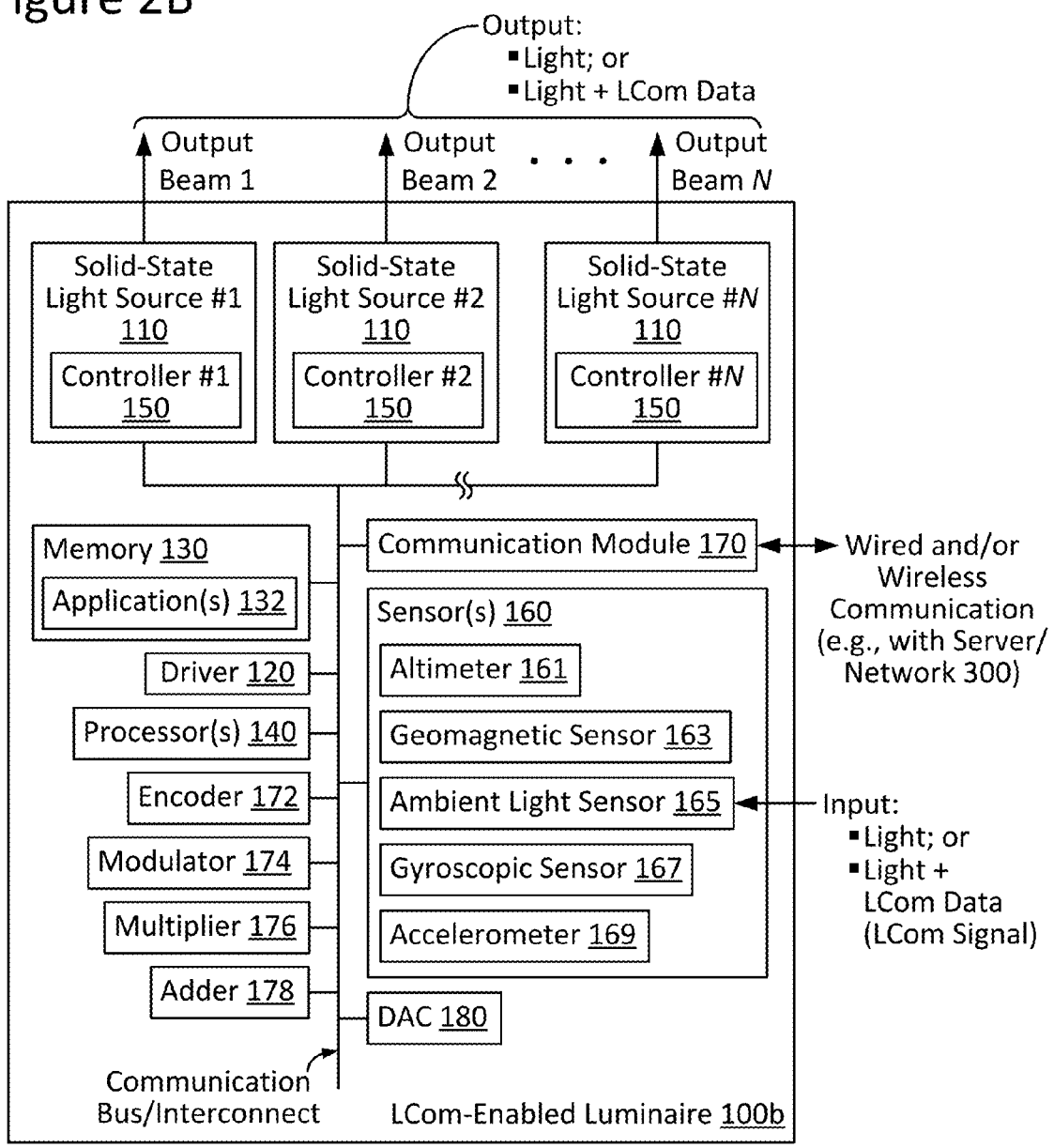

CONTROLLING A SYSTEM THAT INCLUDES LIGHT-BASED COMMUNICATION (LCOM)-ENABLED LUMINAIRES

CROSS-REFERENCE TO RELATED APPLICATIONS

This patent application claims the benefit of: U.S. Provisional Patent Application No. 61/970,317, titled "Light Communication Adaptive Surroundings", filed on Mar. 25, 2014; and U.S. Provisional Patent Application No. 61/970,327, titled "Light Communication Identification", filed on Mar. 25, 2014. Each of these patent applications is herein incorporated by reference in its entirety.

FIELD OF THE DISCLOSURE

The present disclosure relates to solid-state lighting (SSL) and more particularly to light-based communication via SSL.

BACKGROUND

A number of wireless communication technologies currently exist to transmit information or data from a source to a receiver. Examples of wireless communication technologies include short range technologies (such as infrared (IR) and Bluetooth) and local area wireless technologies (such as Wi-Fi), which may utilize radio frequency (RF) signals. These types of wireless technologies may include a pairing or handshake step (e.g., to establish a Bluetooth connection) or may include wireless access points (e.g., Wi-Fi hotspots) to establish network access, and in cases of secured wireless communication, a password or other security credentials normally must be provided in order to establish the communication link.

BRIEF DESCRIPTION OF THE DRAWINGS

FIG. 2B is a block diagram illustrating an LCom-enabled luminaire configured in accordance with another embodiment of the present disclosure.

Figure 1:
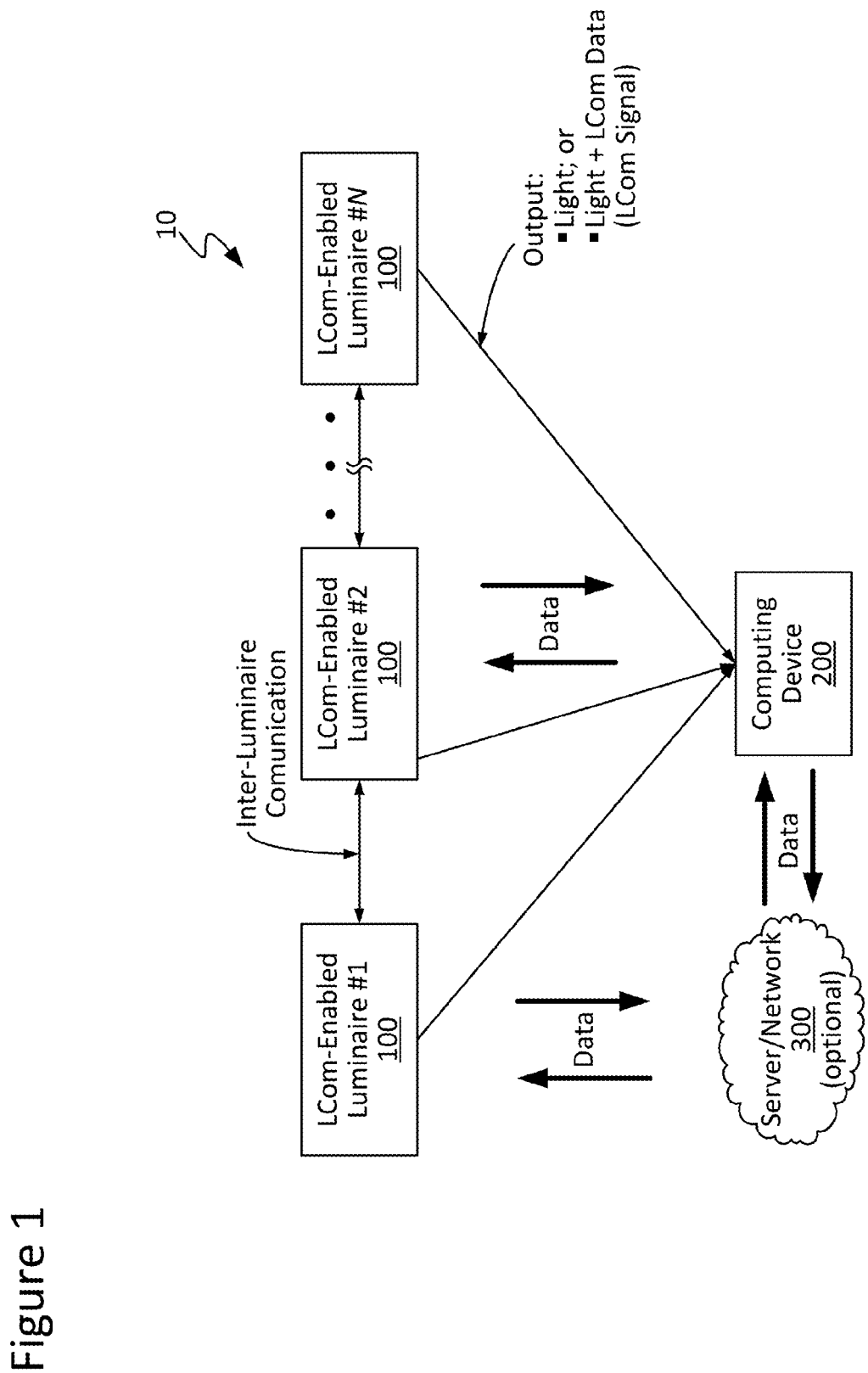
FIG. 1 is a block diagram illustrating an example light-based communication (LCom) system configured in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

Techniques are disclosed for controlling a system including one or more light-based communication (LCom)-enabled luminaires. In some cases, the system may include: one or more LCom-enabled luminaires; a light sensor configured to detect LCom signals emitted from the luminaires; a computing device operatively coupled to the light sensor and configured to decode data from the LCom signals; and a controller configured to control the light output from at least one of the luminaires. The controller may be configured to control one or more of the luminaires in a given area (such as a room, hallway, or building) or the controller may be configured to control all of the luminaires in the given area. The techniques may include calibrating, detecting, or otherwise setting up the system, such that the computing device knows at least one of the unique identification and position of each luminaire in the system. Once the initial set up is completed, the system can be controlled in a number of ways. In some cases the system may be controlled manually by adjusting the light output of luminaires one at a time or a group at a time or all at once, for example. In some cases, the system may be controlled automatically based on at least one of video content, audio content, and data received from one or more of sensors, remote controller devices, audiovisual (AV) devices, computing devices, media playback devices, for example. Numerous configurations and variations will be apparent in light of the present disclosure.

General Overview

As the world evolves where computing devices (e.g., smartphone, tablet, etc.) are now interconnected and have a host of sensors such as cameras and microphones, it may be desirable to use those computing devices to control other devices. Presently, you can turn many devices on and off using a smartphone, such as security systems, power outlets, and baby monitors. The present technologies for bi-directional communication include Bluetooth, Wi-Fi, infrared (IR), and direct wired protocols. Each option poses its own challenges, such as pairing limits, cost, line of sight requirements, and difficulty to setup, respectively. These technologies are used in audiovisual (AV) contexts, such as for surround sound systems. However, there is a need for improvement in controlling the lighting in an area, especially for AV applications. For example, users currently do not have the choice to control lighting in an area in the way that they have the ability to control display device configurations and sound system configurations, leading to a diminished user experience. Further, although systems currently exist for controlling lighting, existing systems have undesired drawbacks such as being time consuming to set up, being unintuitive to use, and not allowing dynamic control.

Thus, and in accordance with some embodiments of the present disclosure, techniques are disclosed for controlling a lighting system using light-based communication (LCom). As used herein, light-based communication (LCom) generally refers to communication between a solid-state luminaire and a receiver device, such as a smartphone or other computing device, using a pulsing light signal that emanates from the luminaire and is encoded with data. In general, the light utilized in LCom may be of any spectral band, visible or otherwise, and may be of any intensity, as desired for a given target application or end-use. In accordance with some embodiments, in an LCom system, a given LCom-enabled luminaire may be configured to transmit a pulsing light signal encoded with data (an LCom signal), and a given receiver device, such as a smartphone or other computing device, may be configured to detect the pulsing light signal encoded with data via one or more light-sensing devices, such as a camera and/or an ambient light sensor, among others. In some embodiments, the total light output may be maintained at a relatively constant level, such that the light output variance is not perceptible by human vision.

Some embodiments relate to techniques for bi-directional communication techniques using LCom. As will be apparent in light of the present disclosure, LCom signals, which generally include modulated light signals, can be used to encode or otherwise provide data which in turn can be used to help determine the identification and/or position of one or more luminaires transmitting or otherwise emitting the LCom signals. The data may include or indicate a luminaire ID or address, a timing signal, and/or control parameters, for example. Therefore, LCom may be an inexpensive method for luminaires to communicate to external devices, particularly for solid-state lighting that already supports pulsing the light signal, thereby requiring only software changes, for example. However, LCom signals may only be provided in one direction, such as from a luminaire to a receiver device. This may be due to most devices that have cameras (or other light sensors) for detecting LCom signals not having the capability to transmit light in an effective manner for LCom purposes. Therefore, audio-based commands can be used to complete the communication loop, as will be described in detail herein. By embedding data in audio waveforms, a multitude of computing and AV devices can be configured to communicate to LCom-enabled luminaires. The audio-based communication may be performed using any type of sound, such as sound audible to a human ear, using ultrasound, infrasound, or some combination thereof, for example.

Some embodiments relate to techniques for identifying LCom-enabled luminaires. In some cases, the techniques include a luminaire communicating its ID to a computing device (e.g., a smartphone or tablet) via one or more LCom signals. As a result, the computing device can determine exactly which luminaire to control. In some cases, a user may be able to aim a light sensor or image capture device (e.g., a rear-facing camera of a smartphone) at the luminaire desired to be controlled. Once the luminaire is in the field of view (FOV) of the light sensor, the ID of the luminaire can be determined using one or more LCom signals received from the luminaire. As used herein, "light sensor" includes any device capable of detecting light or other electromagnetic energy, such as a photodetector, optical detector, image capture device, camera, LED(s) configured to act as a photodiode, charge-coupled device (CCD), active-pixel sensor (APS), or any other suitable device as will be apparent in light of the present disclosure. The ID of the luminaire may be, for example, its internet protocol (IP) address, media access control (MAC) address, Wi-Fi address, Bluetooth address, or some other suitable address or identifier, depending upon the communication protocol used by the luminaire or depending upon the given configuration or end-use. Once a luminaire has been identified (e.g., by decoding the ID of the luminaire via its LCom signals), commands can be issued to the luminaire to adjust one or more characteristics of the light output, such as changing the dimming percentage of the light output or changing the color of the light output, for example. This may be achieved by obtaining the ID via LCom and then using the ID to bootstrap or otherwise establish a second wireless communication connection (e.g., Bluetooth, Wi-Fi, or other suitable communication protocol by which the luminaire can receive wireless communications) for transmitting the light control commands. Note in some embodiments that bi-directional communication between the luminaire and the controlling device can also be carried out using an LCom-based protocol, assuming the luminaire is configured with the ability to receive and process light based communications, as provided herein.

Some embodiments relate to techniques for automatically calibrating LCom-enabled luminaires. By using the LCom signal from a luminaire, a computing device can identify the luminaire (e.g., using the techniques for identifying LCom-enabled luminaires, as variously described herein). A light sensor or camera embedded in or otherwise operatively coupled to the computing device can be used to measure the luminance levels of all luminaires in a given area (such as a room, a hallway, an outdoor space, multiple rooms, a house or building, etc.). The techniques may include: guiding and/or instructing a user about how to rotate the light sensor or camera (or computing device containing the same); identifying 1303 one or more luminaires using received LCom signals; calculating the desired levels of light output in the area; and communicating the desired levels to a controller capable of adjusting the light output of the lighting system. Therefore, the techniques may be used to efficiently identify and gain control over all luminaires in a given area.

Some embodiments relate to techniques for controlling a system including one or more light-based communication (LCom)-enabled luminaires. In some cases, the system may include: one or more LCom-enabled luminaires; a light sensor configured to detect LCom signals emitted from the luminaires; a computing device operatively coupled to the light sensor and configured to decode data from the LCom signals; and a controller configured to control the light output from at least one of the luminaires. The controller may be configured to control one or more of the luminaires in a given area (such as a room, hallway, or building) or the controller may be configured to control all of the luminaires in the given area. The techniques may include calibrating, detecting, or otherwise setting up the system, such that the computing device knows at least one of the unique identification and position of each luminaire in the system. For example, initial set up may include performing the techniques for automatically calibrating LCom-enabled luminaires as described herein Once the initial set up is completed, the system can be controlled in a number of ways. In some cases the system may be controlled manually by adjusting the light output of luminaires one at a time or a group at a time or all at once, for example. In some cases, the system may be controlled automatically based on at least one of video content, audio content, and data received from one or more of sensors, remote controller devices, audiovisual (AV) devices, computing devices, media playback devices, for example.

In some such embodiments, the techniques include dynamically controlling the lighting system, such as providing surround lighting by dynamically controlling the luminaires in a room to adjust the ambient light output based on one or more factors, such as playback from a media device (e.g., playback of a video or movie). In some such cases, the light controller(s) may need to know the luminaires in an area and their position within that area. The position of each luminaire can be determined using the techniques described herein, such as the techniques for automatically calibrating a lighting system including LCom-enabled luminaires and the techniques for identifying an LCom-enabled luminaire.

In some such embodiments, once all of the luminaires in a given area are identified and their respective positions are determined, the light controller can independently control all of the luminaires. The light controller may be a computing device, such as a smartphone, tablet, smart television, AV device, media device, video game console, or a dedicated light controller device, for example. In some cases, the luminaires may be controlled using the bi-directional communication techniques for LCom systems variously described herein. Each LCom-enabled luminaire may be controlled using commands issued by a user or provided by some other suitable method (e.g., commands issued in response to a stimulus, such as the time of day changing, the brightness outside hitting a certain threshold, etc.). Various different characteristics of each luminaire and/or the light output therefrom may be controlled, such as the brightness or hue of the light output. There are a number of cases where dynamic adjustment of the ambient light in an area can increase the user experience, such as: increasing ambient light when video is paused to allow users to move through the area safely; decreasing ambient light during a scary or suspenseful scene of a video; increase ambient light for video game playing to avoid eye strain but decrease the ambient light during pre-animated sections; decrease ambient light during low contrast scenes but increase the ambient light during bright scenes; creating visual effects to enhance video content, such as flashing lights when lightning is displayed in a movie; and providing a spotlight when a remote control is raised by a user to illuminate the remote.

As will be appreciated in light of this disclosure, techniques disclosed herein can be utilized in any of a wide range of LCom applications and contexts. For example, techniques disclosed herein can be utilized, in accordance with some embodiments, in transmitting location and positioning information between an LCom-enabled luminaire and a receiver device. This information may be utilized, in part or in whole, to cause or allow for light control to be implemented, in some embodiments. In some cases, techniques disclosed herein can be utilized as the basis for identifying, establishing communication with, and/or controlling LCom-enabled luminaires. Numerous configurations and variations will be apparent in light of this disclosure.

System Architecture and Operation

FIG. 1 is a block diagram illustrating an example light-based communication (LCom) system 10 configured in accordance with an embodiment of the present disclosure. As can be seen, system 10 may include one or more LCom-enabled luminaires 100 configured for light-based communicative coupling with a receiver computing device 200 via LCom signal(s). As discussed herein, such LCom may be provided, in accordance with some embodiments, via visible light-based signals. In some cases, LCom may be provided in only one direction; for instance, LCom data may be passed from a given LCom-enabled luminaire 100 (e.g., the transmitter) to a computing device 200 (e.g., the receiver), or from a computing device 200 (e.g., the transmitter) to a given LCom-enabled luminaire 100 (e.g., the receiver). In some other cases, LCom may be provided in both or multiple directions; for instance, LCom data may be passed between a given LCom-enabled luminaire 100 and a computing device 200, where both act in a transmitting and receiving (e.g., transceiver) capacity. In some cases in which system 10 includes a plurality of LCom-enabled luminaires 100, all (or some sub-set) of thereof may be configured for communicative coupling with one another (e.g., inter-luminaire communication). In accordance with some embodiments, system 10 optionally may include or otherwise be configured for communicative coupling, for example, with a server/network 300 (discussed below). Communicative coupling may be provided, for example, between server/network 300 and computing device 200 and/or one or more LCom-enabled luminaires 100, as desired. In some embodiments, computing device 200 and one or more luminaires 100 may be communicatively coupled to allow for the transmission of data between the device 200 and luminaire(s) 100.

Figure 2A:
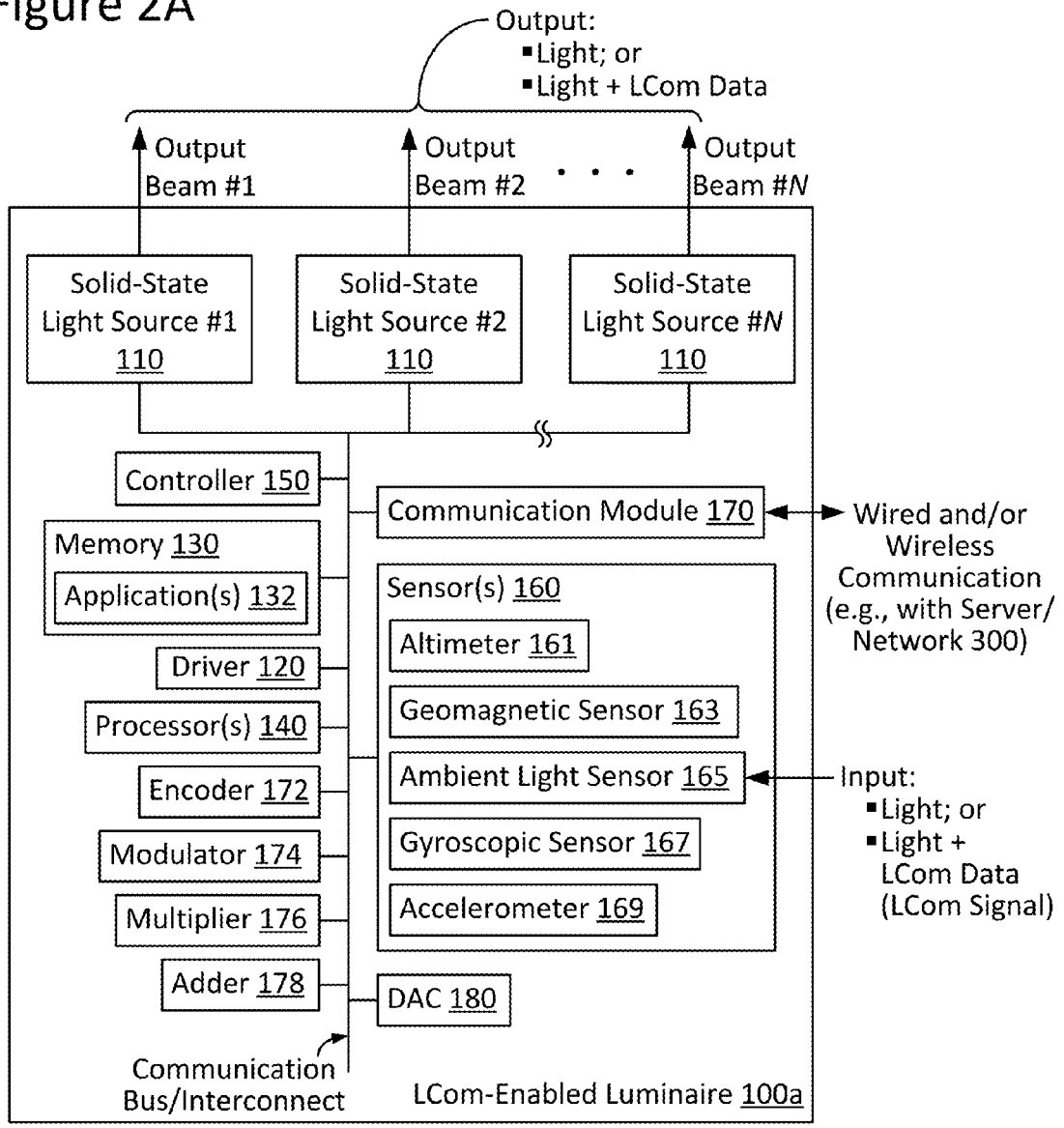
FIG. 2A is a block diagram illustrating an LCom-enabled luminaire configured in accordance with an embodiment of the present disclosure.

FIG. 2A is a block diagram illustrating an LCom-enabled luminaire 100a configured in accordance with an embodiment of the present disclosure. FIG. 2B is a block diagram illustrating an LCom-enabled luminaire 100b configured in accordance with another embodiment of the present disclosure. For consistency and ease of understanding of the present disclosure, LCom-enabled luminaires 100a and 100b hereinafter may be collectively referred to generally as an LCom-enabled luminaire 100, except where separately referenced.

As can be seen, a given LCom-enabled luminaire 100 may include one or more solid-state light sources 110, in accordance with some embodiments. The quantity, density, and arrangement of solid-state light sources 110 utilized in a given LCom-enabled luminaire 100 may be customized, as desired for a given target application or end-use. A given solid-state light source 110 may include one or more solid-state emitters, which may be any of a wide range of semiconductor light source devices, such as, for example: (1) a light-emitting diode (LED); (2) an organic light-emitting diode (OLED); (3) a polymer light-emitting diode (PLED); and/or (4) a combination of any one or more thereof. A given solid-state emitter may be configured to emit electromagnetic radiation (e.g., light), for example, from the visible spectral band and/or other portions of the electromagnetic spectrum not limited to the infrared (IR) spectral band and/or the ultraviolet (UV) spectral band, as desired for a given target application or end-use. In some embodiments, a given solid-state emitter may be configured for emissions of a single correlated color temperature (CCT) (e.g., a white light-emitting semiconductor light source). In some other embodiments, however, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof. In some cases, a given solid-state emitter may be configured as a high-brightness semiconductor light source. In some embodiments, a given solid-state emitter may be provided with a combination of any one or more of the aforementioned example emissions capabilities. In any case, a given solid-state emitter can be packaged or non-packaged, as desired, and in some cases may be populated on a printed circuit board (PCB) or other suitable intermediate/substrate, as will be apparent in light of this disclosure. In some cases, power and/or control connections for a given solid-state emitter may be routed from a given PCB to a driver 120 (discussed below) and/or other devices/componentry, as desired. Other suitable configurations for the one or more solid-state emitters of a given solid-state light source 110 will depend on a given application and will be apparent in light of this disclosure.

A given solid-state light source 110 also may include one or more optics optically coupled with its one or more solid-state emitters. In accordance with some embodiments, the optic(s) of a given solid-state light source 110 may be configured to transmit the one or more wavelengths of interest of the light (e.g., visible, UV, IR, etc.) emitted by solid-state emitter(s) optically coupled therewith. To that end, the optic(s) may include an optical structure (e.g., a window, lens, dome, etc.) formed from any of a wide range of optical materials, such as, for example: (1) a polymer, such as poly(methyl methacrylate) (PMMA) or polycarbonate; (2) a ceramic, such as sapphire ($Al_2O_3$) or yttrium aluminum garnet (YAG); (3) a glass; and/or (4) a combination of any one or more thereof. In some cases, the optic(s) of a given solid-state light source 110 may be formed from a single (e.g., monolithic) piece of optical material to provide a single, continuous optical structure. In some other cases, the optic(s) of a given solid-state light source 110 may be formed from multiple pieces of optical material to provide a multi-piece optical structure. In some cases, the optic(s) of a given solid-state light source 110 may include optical features, such as, for example: (1) an anti-reflective (AR) coating; (2) a reflector; (3) a diffuser; (4) a polarizer; (5) a brightness enhancer; (6) a phosphor material (e.g., which converts light received thereby to light of a different wavelength); and/or (7) a combination of any one or more thereof. In some embodiments, the optic(s) of a given solid-state light source 110 may be configured, for example, to focus and/or collimate light transmitted therethrough. Other suitable types, optical transmission characteristics, and configurations for the optic(s) of a given solid-state light source 110 will depend on a given application and will be apparent in light of this disclosure.

In accordance with some embodiments, the one or more solid-state light sources 110 of a given LCom-enabled luminaire 100 may be electronically coupled with a driver 120. In some cases, driver 120 may be an electronic driver (e.g., single-channel; multi-channel) configured, for example, for use in controlling one or more solid-state emitters of a given solid-state light source 110. For instance, in some embodiments, driver 120 may be configured to control the on/off state, dimming level, color of emissions, correlated color temperature (CCT), and/or color saturation of a given solid-state emitter (or grouping of emitters). To such ends, driver 120 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of driver 120 to adjust AC voltage to driver 120); and/or (8) a combination of any one or more thereof. Other suitable configurations for driver 120 and lighting control/driving techniques will depend on a given application and will be apparent in light of this disclosure.

As will be appreciated in light of this disclosure, a given solid-state light source 110 also may include or otherwise be operatively coupled with other circuitry/componentry, for example, which may be used in solid-state lighting. For instance, a given solid-state light source 110 (and/or host LCom-enabled luminaire 100) may be configured to host or otherwise be operatively coupled with any of a wide range of electronic components, such as: (1) power conversion circuitry (e.g., electrical ballast circuitry to convert an AC signal into a DC signal at a desired current and voltage to power a given solid-state light source 110); (2) constant current/voltage driver componentry; (3) transmitter and/or receiver (e.g., transceiver) componentry; and/or (4) local processing componentry. When included, such componentry may be mounted, for example, on one or more driver 120 boards, in accordance with some embodiments.

As can be seen from FIGS. 2A-2B, a given LCom-enabled luminaire 100 may include memory 130 and one or more processors 140. Memory 130 can be of any suitable type (e.g., RAM and/or ROM, or other suitable memory) and size, and in some cases may be implemented with volatile memory, non-volatile memory, or a combination thereof. A given processor 140 may be configured as typically done, and in some embodiments may be configured, for example, to perform operations associated with a given host LCom-enabled luminaire 100 and one or more of the modules thereof (e.g., within memory 130 or elsewhere). In some cases, memory 130 may be configured to be utilized, for example, for processor workspace (e.g., for one or more processors 140) and/or to store media, programs, applications, and/or content on a host LCom-enabled luminaire 100 on a temporary or permanent basis.

The one or more modules stored in memory 130 can be accessed and executed, for example, by the one or more processors 140 of a given LCom-enabled luminaire 100. In accordance with some embodiments, a given module of memory 130 can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory 130 can be encoded, for example, on a machine-readable medium that, when executed by a processor 140, carries out the functionality of a given LCom-enabled luminaire 100, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 130 (e.g., one or more applications 132, discussed below) can be implemented in hardware, software, and/or firmware, as desired for a given target application or end-use.

In accordance with some embodiments, memory 130 may have stored therein (or otherwise have access to) one or more applications 132. In some instances, a given LCom-enabled luminaire 100 may be configured to receive input, for example, via one or more applications 132 stored in memory 130 (e.g., such as a lighting pattern, LCom data, etc.). Other suitable modules, applications, and data which may be stored in memory 130 (or may be otherwise accessible to a given LCom-enabled luminaire 100) will depend on a given application and will be apparent in light of this disclosure.

In accordance with some embodiments, the one or more solid-state light sources 110 of a given LCom-enabled luminaire 100 can be electronically controlled, for example, to output light and/or light encoded with LCom data (e.g., an LCom signal). To that end, a given LCom-enabled luminaire 100 may include or otherwise be communicatively coupled with one or more controllers 150, in accordance with some embodiments. In some embodiments, such as that illustrated in FIG. 2A, a controller 150 may be hosted by a given LCom-enabled luminaire 100 and operatively coupled (e.g., via a communication bus/interconnect) with the one or more solid-state light sources 110 (1-N) of that LCom-enabled luminaire 100. In this example case, controller 150 may output a digital control signal to any one or more of the solid-state light sources 110 and may do so, for example, based on wired and/or wireless input received from a given local source (e.g., such as on-board memory 130) and/or remote source (e.g., such as a control interface, optional server/network 300, etc.). As a result, a given LCom-enabled luminaire 100 may be controlled in such a manner as to output any number of output beams (1-N), which may include light and/or LCom data (e.g., an LCom signal), as desired for a given target application or end-use.

However, the present disclosure is not so limited. For example, in some other embodiments, such as that illustrated in FIG. 2B, a controller 150 may be hosted, in part or in whole, by a given solid-state light source 110 of a given LCom-enabled luminaire 100 and operatively coupled (e.g., via a communication bus/interconnect) with the one or more solid-state light sources 110. If LCom-enabled luminaire 100 includes a plurality of such solid-state light sources 110 hosting their own controllers 150, then each such controller 150 may be considered, in a sense, a mini-controller, providing LCom-enabled luminaire 100 with a distributed controller 150. In some embodiments, controller 150 may be populated, for example, on one or more PCBs of the host solid-state light source 110. In this example case, controller 150 may output a digital control signal to an associated solid-state light source 110 of LCom-enabled luminaire 100 and may do so, for example, based on wired and/or wireless input received from a given local source (e.g., such as on-board memory 130) and/or remote source (e.g., such as a control interface, optional server/network 300, etc.). As a result, LCom-enabled luminaire 110 may be controlled in such a manner as to output any number of output beams (1-N), which may include light and/or LCom data (e.g., an LCom signal), as desired for a given target application or end-use.

In accordance with some embodiments, a given controller 150 may host one or more lighting control modules and can be programmed or otherwise configured to output one or more control signals, for example, to adjust the operation of the solid-state emitter(s) of a given solid-state light source 110. For example, in some cases, a given controller 150 may be configured to output a control signal to control whether the light beam of a given solid-state emitter is on/off. In some instances, a given controller 150 may be configured to output a control signal to control the intensity/brightness (e.g., dimming; brightening) of the light emitted by a given solid-state emitter. In some cases, a given controller 150 may be configured to output a control signal to control the color (e.g., mixing; tuning) of the light emitted by a given solid-state emitter. Thus, if a given solid-state light source 110 includes two or more solid-state emitters configured to emit light having different wavelengths, the control signal may be used to adjust the relative brightness of the different solid-state emitters in order to change the mixed color output by that solid-state light source 110. In some embodiments, controller 150 may be configured to output a control signal to encoder 172 (discussed below) to facilitate encoding of LCom data for transmission by a given LCom-enabled luminaire 100. In some embodiments, controller 150 may be configured to output a control signal to modulator 174 (discussed below) to facilitate modulation of an LCom signal for transmission by a given LCom-enabled luminaire 100. Other suitable configurations and control signal output for a given controller 150 of a given LCom-enabled luminaire 100 will depend on a given application and will be apparent in light of this disclosure.

In accordance with some embodiments, a given LCom-enabled luminaire 100 may include an encoder 172. In some embodiments, encoder 172 may be configured, for example, to encode LCom data in preparation for transmission thereof by the host LCom-enabled luminaire 100. To that end, encoder 172 may be provided with any suitable configuration, as will be apparent in light of this disclosure.

In accordance with some embodiments, a given LCom-enabled luminaire 100 may include a modulator 174. In some embodiments, modulator 174 may be configured, for example, to modulate an LCom signal in preparation for transmission thereof by the host LCom-enabled luminaire 100. In some embodiments, modulator 174 may be a single-channel or multi-channel electronic driver (e.g., driver 120) configured, for example, for use in controlling the output of the one or more solid-state emitters of a given solid-state light source 110. In some embodiments, modulator 174 may be configured to control the on/off state, dimming level, color of emissions, correlated color temperature (CCT), and/or color saturation of a given solid-state emitter (or grouping of emitters). To such ends, modulator 174 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of modulator 174 to adjust AC voltage to modulator 174); and/or (8) any other suitable lighting control/driving technique, as will be apparent in light of this disclosure. Other suitable configurations and control/driving techniques for modulator 174 will depend on a given application and will be apparent in light of this disclosure.

In accordance with some embodiments, a given LCom-enabled luminaire 100 may include a multiplier 176. Multiplier 176 may be configured as typically done, and in some example embodiments may be configured to combine an input received from an upstream modulator 174 with an input received from an ambient light sensor 165 (discussed below). In some instances, multiplier 176 may be configured to increase and/or decrease the amplitude of a signal passing therethrough, as desired. Other suitable configurations for multiplier 176 will depend on a given application and will be apparent in light of this disclosure.

In accordance with some embodiments, a given LCom-enabled luminaire 100 may include an adder 178. Adder 178 may be configured as typically done, and in some example embodiments may be configured to combine an input received from an upstream multiplier 178 with a DC level input. In some instances, adder 178 may be configured to increase and/or decrease the amplitude of a signal passing therethrough, as desired. Other suitable configurations for adder 178 will depend on a given application and will be apparent in light of this disclosure.

In accordance with some embodiments, a given LCom-enabled luminaire 100 may include a digital-to-analog converter (DAC) 180. DAC 180 may be configured as typically done, and in some example embodiments may be configured to convert a digital control signal into an analog control signal to be applied to a given solid-state light source 110 of the host LCom-enabled luminaire 100 to output an LCom signal therefrom. Other suitable configurations for DAC 180 will depend on a given application and will be apparent in light of this disclosure.

Figure 3:
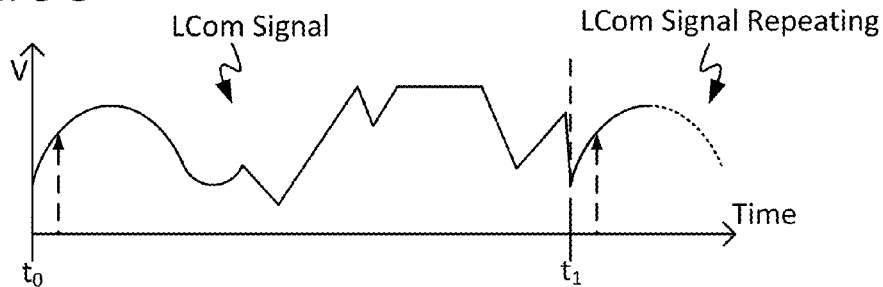
FIG. 3 illustrates an example arbitrary LCom signal as may be transmitted by an LCom-enabled luminaire, in accordance with an embodiment of the present disclosure.

As previously noted, a given LCom-enabled luminaire 100 may be configured, in accordance with some embodiments, to output light and/or light encoded with LCom data (e.g., an LCom signal). FIG. 3 illustrates an example arbitrary LCom signal as may be transmitted by an LCom-enabled luminaire 100, in accordance with an embodiment of the present disclosure. As can be seen here, LCom-enabled luminaire 100 may be configured, in accordance with some embodiments, to transmit a given LCom signal at a given transmission rate over a given time interval ($t_1-t_0$). In some cases, a given LCom-enabled luminaire 100 may be configured to repeatedly output its one or more LCom signals. In any case, the transmission rate may be customized, as desired for a given target application or end-use.

In accordance with some embodiments, a given LCom-enabled luminaire 100 may include one or more sensors 160. In some embodiments, a given LCom-enabled luminaire 100 optionally may include an altimeter 161. When included, altimeter 161 may be configured as typically done, and in some example embodiments may be configured to aid in determining the altitude of a host LCom-enabled luminaire 100 with respect to a given fixed level (e.g., a floor, a wall, the ground, or other surface). In some embodiments, a given LCom-enabled luminaire 100 optionally may include a geomagnetic sensor 163. When included, geomagnetic sensor 163 may be configured as typically done, and in some example embodiments may be configured to determine the orientation and/or movement of a host LCom-enabled luminaire 100 relative to a geomagnetic pole (e.g., geomagnetic north) or other desired heading, which may be customized as desired for a given target application or end-use. In some embodiments, a given LCom-enabled luminaire 100 optionally may include an ambient light sensor 165. When included, ambient light sensor 165 may be configured as typically done, and in some example embodiments may be configured to detect and measure ambient light levels in the surrounding environment of the host LCom-enabled luminaire 100. In some cases, ambient light sensor 165 may be configured to output a signal, for example, to a multiplier 176 of LCom-enabled luminaire 100. In some embodiments, a given LCom-enabled luminaire 100 optionally may include a gyroscopic sensor 167. When included, gyroscopic sensor 167 may be configured as typically done, and in some example embodiments may be configured to determine the orientation (e.g., roll, pitch, and/or yaw) of the host LCom-enabled luminaire 100. In some embodiments, a given LCom-enabled luminaire 100 optionally may include an accelerometer 169. When included, accelerometer 169 may be configured as typically done, and in some example embodiments may be configured to detect motion of the host LCom-enabled luminaire 100. In any case, a given sensor 160 of a given host LCom-enabled luminaire 100 may include mechanical and/or solid-state componentry, as desired for a given target application or end-use. Also, it should be noted that the present disclosure is not so limited only to these example optional sensors 160, as additional and/or different sensors 160 may be provided, as desired for a given target application or end-use, in accordance with some other embodiments. Numerous configurations will be apparent in light of this disclosure.

In accordance with some embodiments, a given LCom-enabled luminaire 100 may include a communication module 170, which may be configured for wired (e.g., Universal Serial Bus or USB, Ethernet, FireWire, etc.) and/or wireless (e.g., Wi-Fi, Bluetooth, etc.) communication, as desired. In accordance with some embodiments, communication module 170 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; and/or (6) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 170, as desired for a given target application or end-use. In some instances, communication module 170 may be configured to facilitate inter-luminaire communication between LCom-enabled luminaires 100. To that end, communication module 170 may be configured to use any suitable wired and/or wireless transmission technologies (e.g., radio frequency, or RF, transmission; infrared, or IR, light modulation; etc.), as desired for a given target application or end-use. Other suitable configurations for communication module 170 will depend on a given application and will be apparent in light of this disclosure.

In accordance with some embodiments, LCom-enabled luminaire 100 may include or otherwise be communicatively coupled with one or more audio input devices 190. A given audio input device 190 can be any device configured to detect sound, audible or otherwise. In some embodiments, a given audio input device 190 may be a microphone configured as typically done. Components of a given audio input device 190 may be implemented in hardware, software, firmware, or a combination of any one or more thereof. In some instances, a given audio input device 190 may be configured to continuously acquire audio data. In some other instances, a given audio input device 190 may be configured to acquire audio data upon detection of a sound that exceeds a volume level threshold or duration threshold (or both), which can be set at any standard or custom value, and in some cases may be user-configurable. In some other instances, a given audio input device 190 may be configured to acquire audio data at periodic intervals, user-configurable intervals, or otherwise as frequently as desired for a given target application or end-use. Other suitable configurations for a given audio input device 190 will depend on a given application and will be apparent in light of this disclosure.

Figure 4:
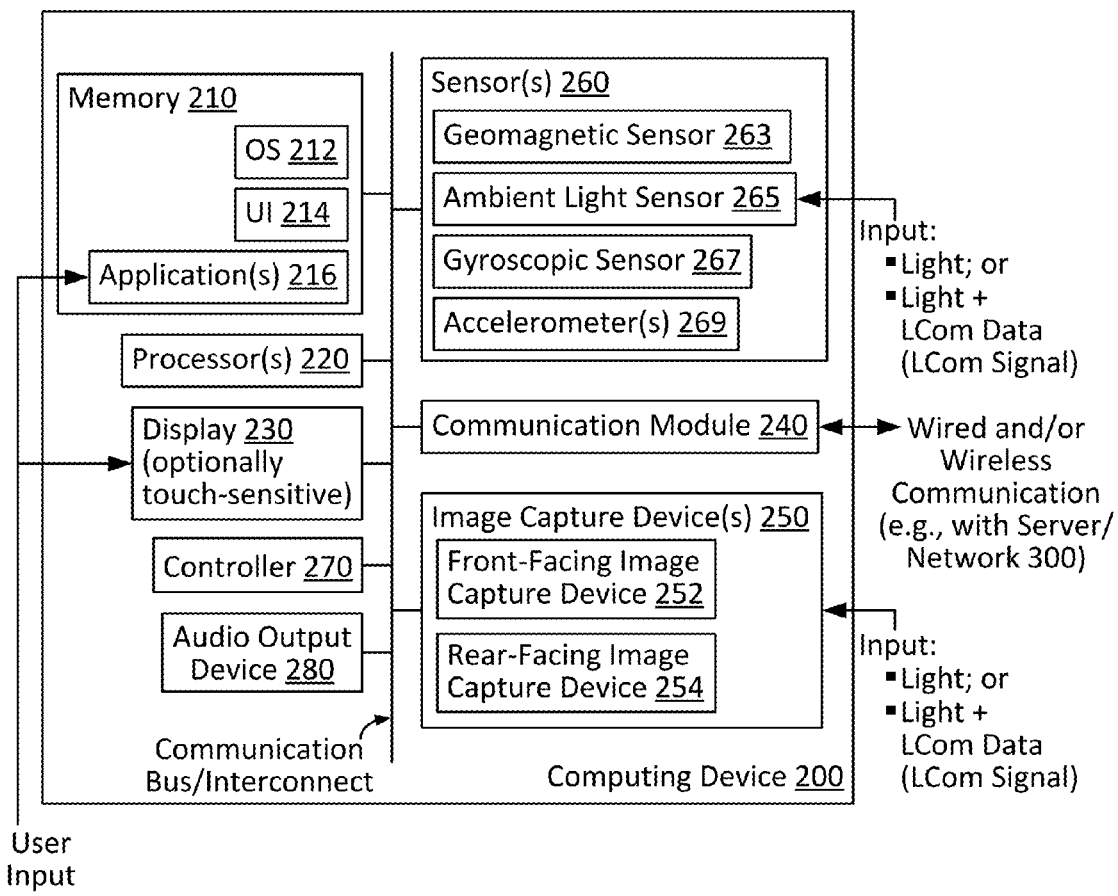
FIG. 4 illustrates an example computing device configured in accordance with an embodiment of the present disclosure.

FIG. 4 illustrates an example computing device 200 configured in accordance with an embodiment of the present disclosure. As discussed herein, computing device 200 may be configured, in accordance with some embodiments: (1) to detect the light pulses of an LCom signal emitted by a transmitting LCom-enabled luminaire 100; and (2) to decode the LCom data from a detected LCom signal. To these ends, computing device 200 can be any of a wide range of computing platforms, mobile or otherwise. For example, in accordance with some embodiments, computing device 200 can be, in part or in whole: (1) a laptop/notebook computer or sub-notebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; and/or (12) a combination of any one or more thereof. Other suitable configurations for computing device 200 will depend on a given application and will be apparent in light of this disclosure.

As can be seen from FIG. 4, computing device 200 may include memory 210 and one or more processors 220. Memory 210 can be of any suitable type (e.g., RAM and/or ROM, or other suitable memory) and size, and in some cases may be implemented with volatile memory, non-volatile memory, or a combination thereof. A given processor 220 of computing device 200 may be configured as typically done, and in some embodiments may be configured, for example, to perform operations associated with computing device 200 and one or more of the modules thereof (e.g., within memory 210 or elsewhere). In some cases, memory 210 may be configured to be utilized, for example, for processor workspace (e.g., for one or more processors 220) and/or to store media, programs, applications, and/or content on computing device 200 on a temporary or permanent basis.

The one or more modules stored in memory 210 can be accessed and executed, for example, by the one or more processors 220 of computing device 200. In accordance with some embodiments, a given module of memory 210 can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory 210 can be encoded, for example, on a machine-readable medium that, when executed by a processor 220, carries out the functionality of computing device 200, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 210 (e.g., such as OS 212, UI 214, and/or one or more applications 216, each discussed below) can be implemented in hardware, software, and/or firmware, as desired for a given target application or end-use.

In accordance with some embodiments, memory 210 may include an operating system (OS) 212. OS 212 can be implemented with any suitable OS, mobile or otherwise, such as, for example: (1) Android OS from Google, Inc.; (2) iOS from Apple, Inc.; (3) BlackBerry OS from BlackBerry Ltd.; (4) Windows Phone OS from Microsoft Corp; (5) Palm OS/Garnet OS from Palm, Inc.; (6) an open source OS, such as Symbian OS; and/or (7) a combination of any one or more thereof. As will be appreciated in light of this disclosure, OS 212 may be configured, for example, to aid in processing LCom data during its flow through computing device 200. Other suitable configurations and capabilities for OS 212 will depend on a given application and will be apparent in light of this disclosure.

In accordance with some embodiments, computing device 200 may include a user interface (UI) module 214. In some cases, UI 214 can be implemented in memory 210 (e.g., as generally shown in FIG. 4), whereas in some other cases, UI 214 can be implemented in a combination of locations (e.g., at memory 210 and at display 230, discussed below), thereby providing UI 214 with a given degree of functional distributedness. UI 214 may be configured, in accordance with some embodiments, to present a graphical UI (GUI) at display 230 that is configured, for example, to aid in carrying out any of the various LCom-related techniques discussed herein. Other suitable configurations and capabilities for UI 214 will depend on a given application and will be apparent in light of this disclosure.

In accordance with some embodiments, memory 210 may have stored therein (or otherwise have access to) one or more applications 216. In some instances, computing device 200 may be configured to receive input, for example, via one or more applications 216 stored in memory 210 (e.g., such as an indoor navigation application). Other suitable modules, applications, and data which may be stored in memory 210 (or may be otherwise accessible to computing device 200) will depend on a given application and will be apparent in light of this disclosure.

As can be seen further from FIG. 4, computing device 200 may include a display 230, in accordance with some embodiments. Display 230 can be any electronic visual display or other device configured to display or otherwise generate an image (e.g., image, video, text, and/or other displayable content) there at. In some instances, display 230 may be integrated, in part or in whole, with computing device 200, whereas in some other instances, display 230 may be a stand-alone component configured to communicate with computing device 200 using any suitable wired and/or wireless communications means.

In some cases, display 230 optionally may be a touchscreen display or other touch-sensitive display. To that end, display 230 may utilize any of a wide range of touch-sensing techniques, such as, for example: (1) resistive touch-sensing; (2) capacitive touch-sensing; (3) surface acoustic wave (SAW) touch-sensing; (4) infrared (IR) touch-sensing; (5) optical imaging touch-sensing; and/or (6) a combination of any one or more thereof. In a more general sense, and in accordance with some embodiments, an optionally touch-sensitive display 230 generally may be configured to detect or otherwise sense direct and/or proximate contact from a user's finger, stylus, or other suitable implement at a given location of that display 230. In some cases, an optionally touch-sensitive display 230 may be configured to translate such contact into an electronic signal that can be processed by computing device 200 (e.g., by the one or more processors 220 thereof) and manipulated or otherwise used to trigger a given GUI action. In some cases, a touch-sensitive display 230 may facilitate user interaction with computing device 200 via the GUI presented by such display 230. Numerous suitable configurations for display 230 will be apparent in light of this disclosure.

In accordance with some embodiments, computing device 200 may include a communication module 240, which may be configured for wired (e.g., Universal Serial Bus or USB, Ethernet, FireWire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In accordance with some embodiments, communication module 240 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 240, as desired for a given target application or end-use. In some instances, communication module 240 may be configured to communicate with one or more LCom-enabled luminaires 100. In some cases, communication module 240 of computing device 200 and communication module 170 of a given LCom-enabled luminaire 100 may be configured to utilize the same communication protocol. In some cases, communication module 240 may be configured to communicate with a server/network 300 (discussed below). Other suitable configurations for communication module 240 will depend on a given application and will be apparent in light of this disclosure.

Also, as can be seen from FIG. 4, computing device 200 may include one or more image capture devices 250, such as a front-facing image capture device 252 and/or a rear-facing image capture device 254, in accordance with some embodiments. For consistency and ease of understanding of the present disclosure, front-facing image capture device 252 and rear-facing image capture device 254 hereinafter may be collectively referred to generally as an image capture device 250, except where separately referenced.

A given image capture device 250 can be any device configured to capture digital images, such as a still camera (e.g., a camera configured to capture still photographs) or a video camera (e.g., a camera configured to capture moving images comprising a plurality of frames). In some cases, a given image capture device 250 may include components such as, for instance, an optics assembly, an image sensor, and/or an image/video encoder, and may be integrated, in part or in whole, with computing device 200. These components (and others, if any) of a given image capture device 250 may be implemented in any combination of hardware, software, and/or firmware, as desired for a given target application or end-use. A given image capture device 250 can be configured to operate using light, for example, in the visible spectrum and/or other portions of the electromagnetic spectrum not limited to the infrared (IR) spectrum, ultraviolet (UV) spectrum, etc. In some instances, a given image capture device 250 may be configured to continuously acquire imaging data. As described herein, a given image capture device 250 of computing device 200 may be configured, in accordance with some embodiments, to detect the light and/or LCom signal output of a transmitting LCom-enabled luminaire 100. In some instances, a given image capture device 250 may be, for example, a camera like one typically found in smartphones or other mobile computing devices. Other suitable configurations for a given image capture device 250 (e.g., front-facing image capture device 252; rear-facing image capture device 254) of computing device 200 will depend on a given application and will be apparent in light of this disclosure.

In accordance with some embodiments, computing device 200 may include one or more sensors 260. In some embodiments, computing device 200 optionally may include a geomagnetic sensor 263. When included, geomagnetic sensor 263 may be configured as typically done, and in some example embodiments may be configured to determine the orientation and/or movement of a host computing device 200 relative to a geomagnetic pole (e.g., geomagnetic north) or other desired heading, which may be customized as desired for a given target application or end-use. In some embodiments, computing device 200 optionally may include an ambient light sensor 265. When included, ambient light sensor 265 may be configured as typically done, and in some example embodiments may be configured to detect and measure ambient light levels in the surrounding environment of the host computing device 200. In some embodiments, computing device 200 optionally may include a gyroscopic sensor 267. When included, gyroscopic sensor 267 may be configured as typically done, and in some example embodiments may be configured to determine the orientation (e.g., roll, pitch, and/or yaw) of the host computing device 200. In some embodiments, computing device 200 optionally may include an accelerometer 269. When included, accelerometer 269 may be configured as typically done, and in some example embodiments may be configured to detect motion of the host computing device 200. In any case, a given sensor 260 of a given host computing device 200 may include mechanical and/or solid-state componentry, as desired for a given target application or end-use. Also, it should be noted that the present disclosure is not so limited only to these example optional sensors 260, as additional and/or different sensors 260 may be provided, as desired for a given target application or end-use, in accordance with some other embodiments. Numerous configurations will be apparent in light of this disclosure.

In accordance with some embodiments, computing device 200 may include or otherwise be communicatively coupled with one or more controllers 270. A given controller 270 may be configured to output one or more control signals to control any one or more of the various components/modules of computing device 200 and may do so, for example, based on wired and/or wireless input received from a given local source (e.g., such as on-board memory 210) and/or remote source (e.g., such as a control interface, optional server/network 300, etc.). In accordance with some embodiments, a given controller 270 may host one or more control modules and can be programmed or otherwise configured to output one or more control signals, for example, to adjust the operation of a given portion of computing device 200. For example, in some cases, a given controller 270 may be configured to output a control signal to control operation of a given image capture device 250 (e.g., front-facing image capture device 252 and/or rear-facing image capture device 254). In some instances, a given controller 270 may be configured to output a control signal to control operation of one or more sensors 260. Other suitable configurations and control signal output for a given controller 270 of computing device 200 will depend on a given application and will be apparent in light of this disclosure.

As can be seen further from FIG. 4, computing device 200 may include an audio output device 280, in accordance with some embodiments. Audio output device 280 can be, for example, a speaker or any other device capable of producing sound from an audio data signal, in accordance with some embodiments. Audio output device 280 can be configured, for example, to reproduce sounds local to and/or received by its host computing device 200. In some instances, audio output device 280 may be integrated, in part or in whole, with computing device 200, whereas in some other instances, audio output device 280 may be a stand-alone component configured to communicate with computing device 200 using any suitable wired and/or wireless communications means, as desired. Other suitable types and configurations for audio output device 280 will depend on a given application and will be apparent in light of this disclosure.

Server/network 300 can be any suitable public and/or private communications network. For instance, in some cases, server/network 300 may be a private local area network (LAN) operatively coupled to a wide area network (WAN), such as the Internet. In some cases, server/network 300 may include one or more second-generation (2G), third-generation (3G), and/or fourth-generation (4G) mobile communication technologies. In some cases, server/network 300 may include a wireless local area network (WLAN) (e.g., Wi-Fi wireless data communication technologies). In some instances, server/network 300 may include Bluetooth wireless data communication technologies. In some cases, server/network 300 may include supporting infrastructure and/or functionalities, such as a server and a service provider, but such features are not necessary to carry out communication via server/network 300. In some instances, computing device 200 may be configured for communicative coupling, for example, with a server/network 300 and one or more LCom-enabled luminaires 100. In some cases, computing device 200 may be configured to receive data from server/network 300, for example, which serves to supplement LCom data received by computing device 200 from a given LCom-enabled luminaire 100. In some instances, computing device 200 may be configured to receive data (e.g., such as position, ID, and/or other data pertaining to a given LCom-enabled luminaire 100) from server/network 300 that facilitates indoor navigation via one or more LCom-enabled luminaires 100. In some cases, server/network 300 may include or otherwise have access to one or more lookup tables of data that may be accessed by a computing device 200 communicatively coupled therewith. Numerous configurations for server/network 300 will be apparent in light of this disclosure.

Bi-Directional Communication Techniques for LCom Systems

As previously noted, the present technologies for bi-directional communication include Bluetooth, Wi-Fi, infrared (IR), and direct wired protocols. Each option poses its own challenges, such as pairing limits, cost, line of sight requirements, and difficulty to setup, respectively. More specifically, with respect to Bluetooth, due to pairing limitations, complexities arise when multiple sources are trying to use one device. With respect to Wi-Fi, all devices involved in the communication require expensive Wi-Fi modules and the communication requires an initial setup to ensure the devices are on the same local area network. With respect to IR, line of sight is required, which greatly limits configurations and versatility. With respect to wired options, in addition to the logistics obstacles, wireless options are generally preferred by today's consumers.

Thus, and in accordance with some embodiments of the present disclosure, techniques are disclosed for bi-directional communication techniques using LCom. In some embodiments, LCom may be an inexpensive method for luminaires to communicate to external devices, particularly for solid-state lighting that already supports pulsing the light signal, thereby requiring only software changes, for example. However, LCom signals may only be provided in one direction, such as from a luminaire to a receiver device. This may be due to most devices that have cameras (or other light sensors) for detecting LCom signals not having the capability to transmit light in an effective manner for LCom purposes. Therefore, audio-based commands can be used to complete the communication loop, as will be described in detail herein. By embedding data in audio waveforms, a multitude of computing and AV devices can be configured to communicate to LCom-enabled luminaires. The audio-based communication may be performed using any type of sound, such as sound audible to a human ear, using ultrasound, infrasound, or some combination thereof, for example.

Figure 5:
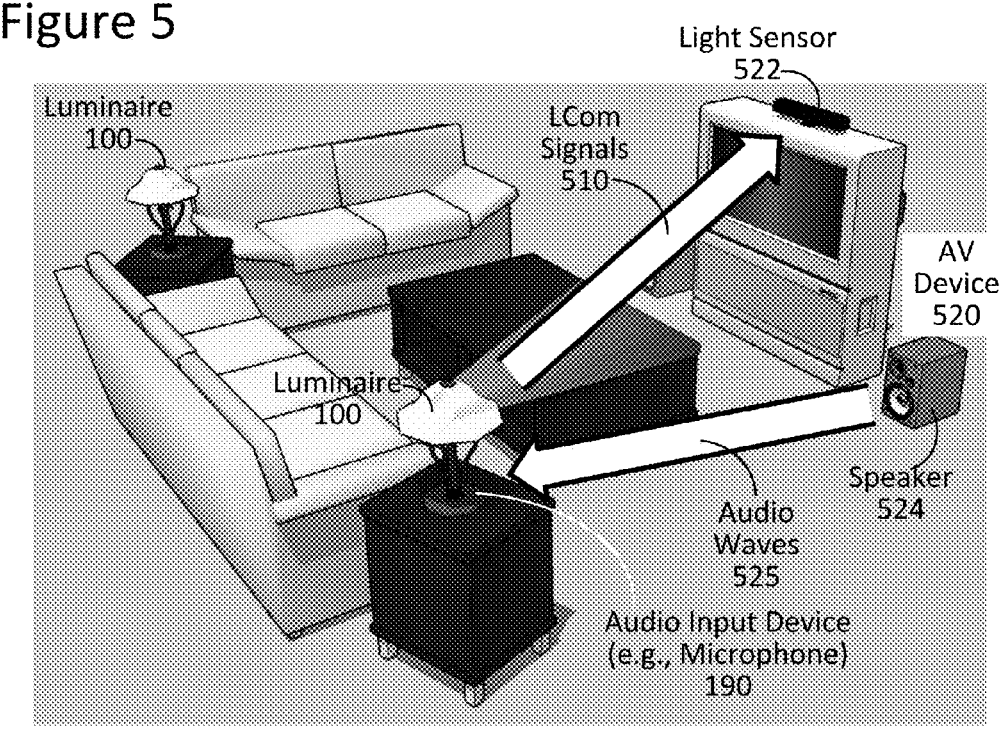
FIG. 5 illustrates a lighting system including bi-directional communication with an audiovisual (AV) device using LCom and audio-based communication, in accordance with an embodiment of the present disclosure.

FIG. 5 illustrates a lighting system including bi-directional communication with an audiovisual (AV) device using LCom and audio-based communication, in accordance with an embodiment of the present disclosure. As can be seen, the system includes two LCom-enabled luminaires 100, an AV device 520, a light sensor 522 operatively coupled to the AV device 520, and two speakers 524 operatively coupled to the AV device. The AV device may be, for example, a home media system, an AV receiver (AVR), a gaming console, a computer, a sound system, a television receiver, or any other suitable device as will be apparent in light of this disclosure. The light sensor 522 may be any suitable device capable of detecting light, such as a photodetector, a camera or image capture device, a mobile computing device including a light sensor, a motion sensing device (e.g., a Microsoft Kinect, a PlayStation Eye or PlayStation Camera, etc.), or any other suitable device as will be apparent in light of this disclosure. The speakers 524 may be any suitable audio output devices capable of producing sound from an audio data signal, for example. The LCom-enabled luminaires 100 may be configured in any suitable manner and may include architecture as variously described herein. In this example case, the luminaires 100 each include an audio input device 190 configured to detect sound, audible or otherwise, such as a microphone configured as typically done.

As previously described FIG. 5 illustrates an example bi-directional communication loop which uses LCom (e.g., via LCom signals 510) to communicate from the luminaires 100 to the AV device 520 (e.g., using light sensor 522) and audio-based communication (e.g., via audio waves 525) to communication from the AV device 520 (e.g., using speakers 524) to the luminaires 100 (e.g., using audio input devices 190). LCom may be performed using the techniques variously described herein. In some embodiments, to transmit data using the audio-based communication, the data can be embedded in an audio stream in a manner that is not noticeable to the consumer. In some such embodiments, LCom can be used to aid in delivering clear communication by providing a clear timing pulse. Because the AV device 520 has control of the spectral output of the audio signal (e.g., via the audio waves 525 emitted from speakers 524), the AV device 520 has the ability to inject or reject certain frequencies at certain times. For example, the AV device 520 can regulate the frequency content at the exact times provided by the LCom signal 510. As a result, the audio input devices 190 of luminaires 100 can know when to detect the absence or presence of a certain frequency. Without the synchronization, the luminaires 100 may have difficulty in identifying a communication signal added to audio waves 525.

Figure 6:
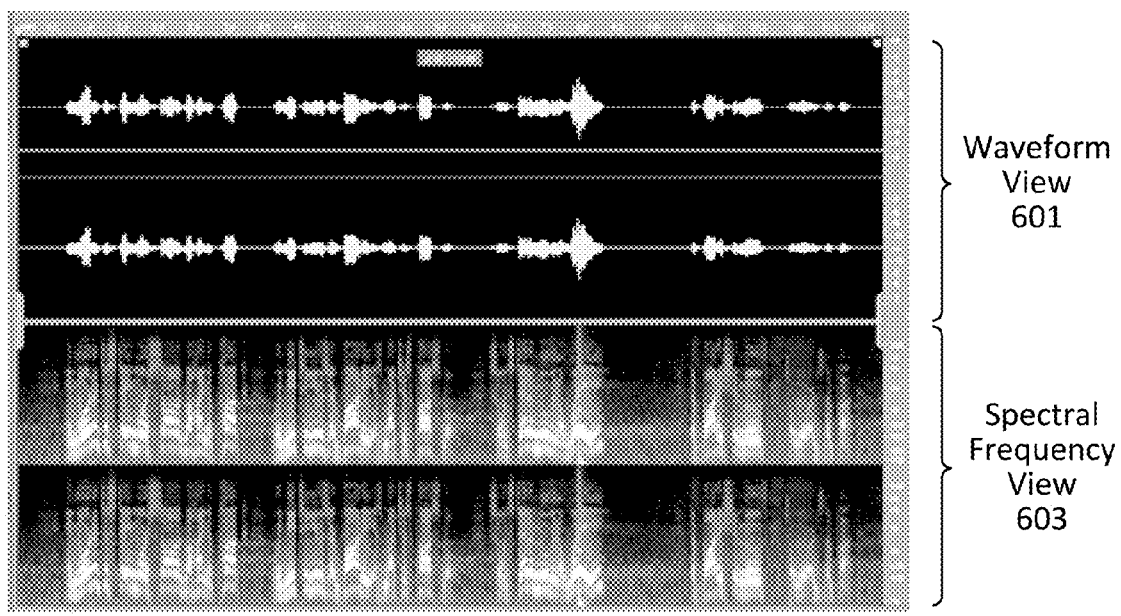
FIG. 6 illustrates an example audio wave in waveform view and spectral frequency view, in accordance with an embodiment of the present disclosure.

FIG. 6 illustrates an example audio wave in waveform view 601 and spectral frequency view 603, in accordance with an embodiment of the present disclosure. In this example, the plots are of a sample of a human voice over time. The vertical or y-axis is frequency and the horizontal or x-axis is time. The recording of the audio sample was performed in stereo, so each plot shows the left and right channels. The amplitude of the plot of the waveform view 601 is the vertical axis representing how much sound passes through air to an audio input device (or a human ear) with positive and negative pressure waves. The bottom two panels are the respective spectrum frequency view 603 of the waveforms in the top two panels.

Figure 7:
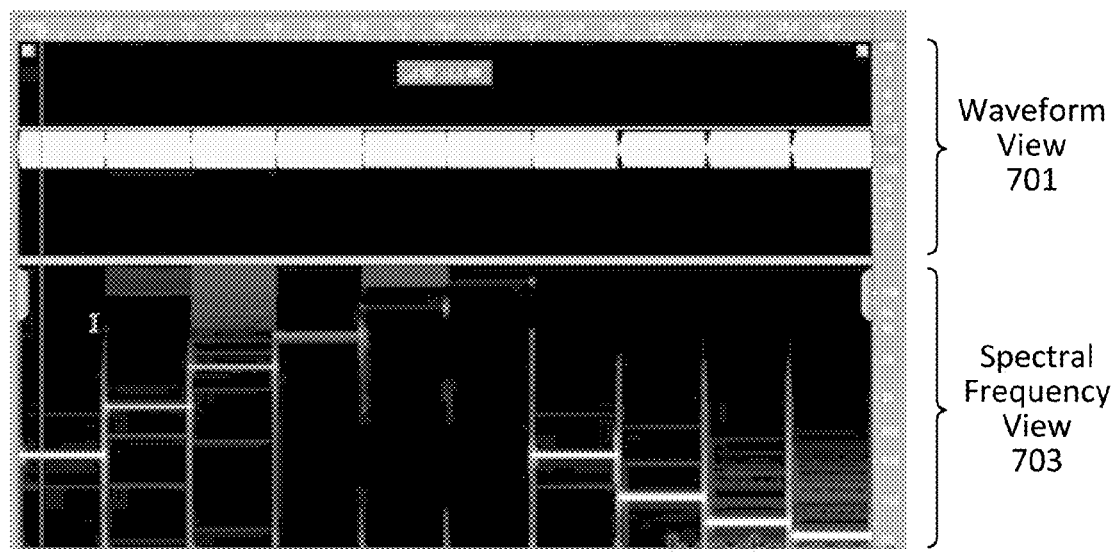
FIG. 7 illustrates an example audio wave in waveform view and spectral frequency view, in accordance with another embodiment of the present disclosure.

FIG. 7 illustrates an example audio wave in waveform view 701 and spectral frequency view 703, in accordance with an embodiment of the present disclosure. Again, the vertical or y-axis is frequency and the horizontal or x-axis is time. In this example, the plot is of a simple frequency, where only a single frequency is playing at a time. More specifically, a single note is being played in the plot with each segment played at the next higher octave. Further, this is the pure C note without any overtones introduced from the instrument itself, as opposed to the example case shown in FIG. 6. The waveform view 701 is shown in the upper plot and the spectral frequency view 703 is shown in the lower plot. As can be seen in FIG. 7, if a waveform consists of only one frequency, then the spectrum frequency view consists of only horizontal lines.

Locking into a particular frequency can be performed using any known or suitable technique, such as using the techniques used for radio frequency (RF) modulated signals. Therefore, an important aspect of the audio-based communication described herein is synchronizing the audio output with LCom signals transmitted from one or more luminaires 100. This can be achieved, for example, by having the AV device 520 of FIG. 5 transmit a tone at a certain frequency for a short period of time that is synchronized with the LCom signal 510 transmitted from one or more of the luminaires 100. The short tone pulse acts as a data package for transmitting information from the AV device 520 (e.g., using speakers 524 and carrying the signal over audio waves 525) to the luminaires 100 (e.g., detected using audio input devices 190). The method of audio-based communication can include one or more of the following: create a command; obtain a synchronization signal from one or more luminaires 100 through LCom signal(s) 510; encode the command into short tones at a designated carrier frequency that is synchronized with the luminaire(s) 100; and each luminaire 100 can receive the audio using an audio input device 190 (e.g., a microphone) to determine the presence or absence of a frequency during the synchronization time. Those presences and absences of the signal can be interpreted as the data bit pattern.

Figure 8A:
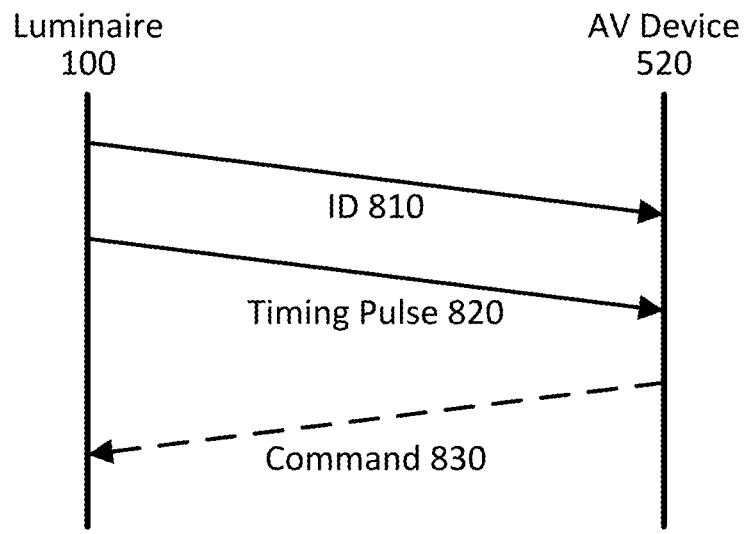
FIGS. 8A-B illustrate example signal transmission timing diagrams for controlling the lighting system of FIG. 5, in accordance with some embodiments of the present disclosure.
Figure 8B:
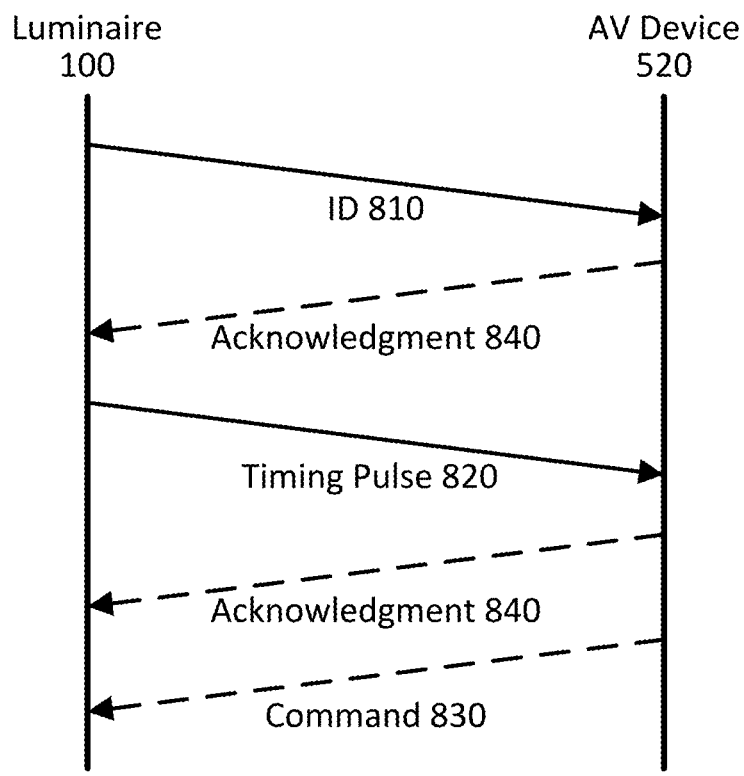

FIGS. 8A-B illustrate example signal transmission timing diagrams for controlling the lighting system of FIG. 5, in accordance with some embodiments of the present disclosure. In FIGS. 8A-B, the left vertical line represents the luminaire 100 of FIG. 5 and the right vertical line represents the AV device 520. The solid line arrows represent signals being transmitted from the luminaire 100 to the AV device 520 and the dotted line arrows represent signals being transmitted from the AV device 520 to the luminaire 100, and the timing of the signals go from top to bottom, with the top most signal being the first signal and the bottom most being the last, in these example diagrams. In FIG. 8A, the signals coming from the luminaire(s) 100, are constant and do not depend on any feedback from the AV device 520. Therefore, the light control is performed without acknowledgment from the AV device 520. As can be seen in FIG. 8A, the luminaire 100 transmits its identification (ID) 810 and a timing pulse 820 and the AV device 520 transmits a command signal.

In FIG. 8B, acknowledgment transmissions are sent by the AV device 520, which are additional data that indicate a transmission from the luminaire 100 has been received. As can be seen, the diagram starts with the luminaire 100 transmitting its ID 810, the AV device 520 responding with a first acknowledgement 840, the luminaire 100 then transmitting a timing pulse 820, and the AV device 520 responding with a second acknowledgment 840 and a command 830. Although the sequence illustrated in FIG. 8B may result in more reliable communication, in such a case, the luminaire may have to be intelligent enough to have the ability to respond to signals from the AV device 520 (e.g., be operatively coupled to a processor or controller capable of handling such responses). Note that the data transmitted from the luminaire 100 to the AV device 520 (e.g., ID 810 and timing pulse 820 data) may be encoded and transmitted using any suitable techniques (e.g., via LCom signals 510) and the data transmitted from the AV device 520 to the luminaire 100 (e.g., command 830 and acknowledgment 840 data) may be encoded and transmitted using any suitable techniques (e.g., via audio waves 525). In some instances, acknowledgement transmissions may be sent by the luminaire 100 to the AV device 520 via LCom signals 510, for example. In some such instances, the luminaire 100 would include componentry and programming to support the extra logic required to send out an acknowledgment signal. Further, in some such instances, the luminaire 100 would have to have the ability to pause its continuous output of ID 810 and/or timing signals 820 to be able to respond. However, such a handshaking process can increase reliability and avoid having to repeat commands multiple times to ensure accuracy.

The command 830 may be originated in various ways. For example, a user may want to send a command to the luminaires 100 in the system to change the light output in some manner, such as changing the brightness or hue, for example. The command may be issued using any number of suitable devices, such as: directly selecting the command at the AV device 520; automatically controlling the lighting via the AV device 520 (e.g., issuing commands to synchronize the light output with the video and/or audio content being output by the AV device 520); selecting the command via a smartphone application, the smartphone then communicating the command to the AV device 520 through a communication medium, such as via a network, Wi-Fi, or Bluetooth connection, for example; using a smart television or other display device that is communicatively coupled to the AV device 520; or any other suitable technique, such as using other suitable devices to issue lighting commands to the AV device, either manually (e.g., based on user input) or automatically (e.g., in response to a stimulus or change in environment).

After the AV device 520 has received a command that will be used to control the lighting system (e.g., change light color output to red, increase dimming to 80%, etc.), the AV device may identify whether there are any luminaires 100 available to control. The luminaires 100 may be identified using their IDs, which may be received via signals (e.g., LCom signals) including luminaire IDs 810. Identifying available luminaires 100 may be performed before commands are issued or at the time of lighting control based on the command. The luminaire IDs 810 can be used to help the AV device 520 determine how to address each individual luminaire 100 and include that as part of command 830. If all luminaires 100 controlled equally, then identifying each individual luminaire (e.g., via their respective IDs), may not be needed, but it may still be used as part of the timing signal, for example.

Figure 9:
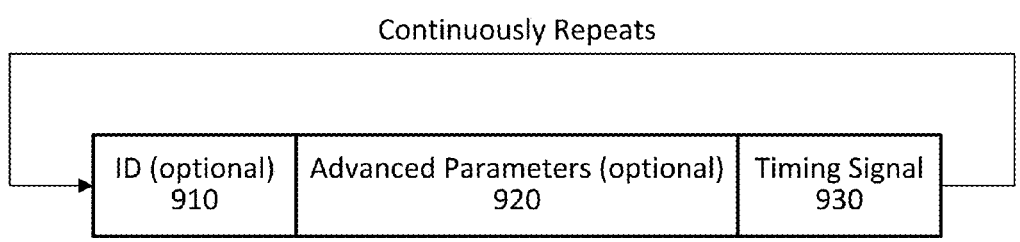
FIG. 9 illustrates an example data packet transmitted from the luminaire of FIG. 5 to the AV device, in accordance with an embodiment of the present disclosure.

FIG. 9 illustrates an example data packet transmitted from the luminaire 100 of FIG. 5 to the AV device 520, in accordance with an embodiment of the present disclosure. As can be seen in this example case, the data packet includes the luminaire ID 910, advanced parameters 920, and a timing signal 930, and the entirety of the data packet may be continuously repeated and may be transmitted via one or more LCom signals 510, for example. The ID data 910 may be optional and it may be, for example, 16 bits of data or some other suitable amount. In some cases, the ID data 910 may be the actual ID of the transmitting luminaire 100 or it may be data that can be used to determine the ID of the transmitting luminaire 100. The advanced parameters data 920 may be optional and it may be, for example 16 bits of data or some other suitable amount. The ID 910 and advanced parameters 920, if included in the data packet, may be used for independent control of luminaires within the lighting system and/or for advanced functionality purposes, for example. In some instances, the timing pulse 930 may be a part of the ID 910. In other words, the AV device 520 may be configured to lock into a certain LCom data transition and estimate the timing signal from that transmission without the need for a designated timing signal (e.g., lock into when the ID data packet begins/ends, etc.).

Figure 10:
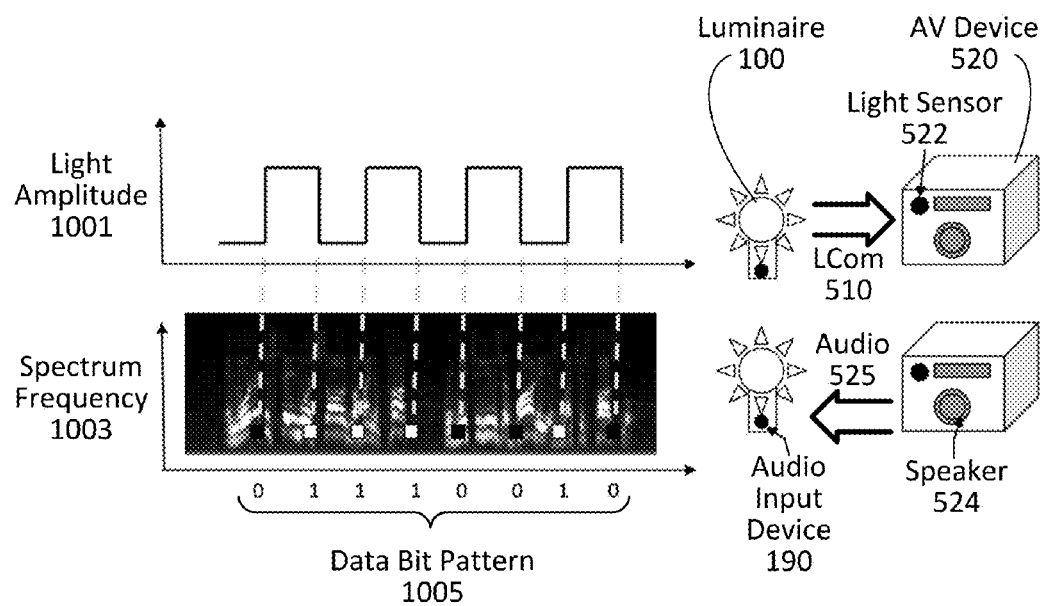
FIG. 10 illustrates the timing alignment of the LCom timing signal of FIG. 9 with an audio wave, in accordance with an embodiment of the present disclosure.

FIG. 10 illustrates the timing alignment of the LCom timing signal 930 of FIG. 9 with an audio wave, in accordance with an embodiment of the present disclosure. For ease of description, the system of FIG. 5 (including luminaire 100, audio input device 190, LCom signals 510, AV device 520, light sensor 522, speaker 524, and audio wave 525) will be used to discuss the timing alignment shown in FIG. 10. The timing signal data 930 can be used to determine time stamps, which can be used for trigger times for communicating back to the luminaire 100 (e.g., via audio waves 525). As the timing signal continues from the luminaire, the timing remains constant between the luminaire 100 and the AV device 520. Therefore, every time the luminaire 100 transmits a timing signal 930, it can also activate the audio input device 190 (e.g., a microphone) to detect the presence of a frequency at that time. The AV device 520 can then either populate or depopulate audio content at that frequency. To help prevent the luminaire 100 from detecting audio waves 525 coming from the AV device 520 (e.g., via speaker 524) which are natural audio content and not intended for audio-based communication, error checking can be used, such as using check sums, repeating the command a few times to force agreement, or using a unique identifying header, for example. In some instances, such as to increase data packet sized, multiple frequencies can be designated to contain data rather than just one. In some such instances, rather than always transmitting at, for example, 450 Hz, data can be transmitted at 450, 640, and 730 Hz to triple the possible amount of data that can be transmitted at a given time.

Once the synchronization is established, the AV device 520 can populate/depopulate the frequency based on a bit pattern correlating to the light command. For example, as can be seen in FIG. 10, the light amplitude plot 1001 sets the timing for the communication (using timing signals 930), which allows data to be sent via audio waves 525 that can be interpreted as high/1 or low/0 signals at the appropriate time, which is shown in the spectrum frequency plot 1003. The resulting data bit pattern 1005 is shown below the spectrum frequency plot 1003. The black squares represent the absence of the frequency and the white squares represent the presence of the frequency. In this example case, the specific resulting data bit pattern 1005 is "01110010", which could mean any number of things, such as "increase brightness to 50%" or "change light output color to red", for example. The assignment of bit pattern to command is arbitrary and can be preset (e.g., factory configured) or manually set by a user (e.g., user configured), for example. At the luminaire 100, the audio input device 190 detects the absence or presence of the frequency to determine the data bit pattern 1005. In some instances, the luminaire 100 may be configured to wait until the data bit pattern 1005 representing the command is repeated at least 2, 3, or 5 times (or some other suitable floor) to verify that the command is valid before executing the command. In this case, if the command is "increase brightness to 50%", then once the command was verified, the luminaire 100 may adjust the light output to 50% luminance. Various possible commands will be apparent in light of the present disclosure and may depend upon the configuration of the lighting system.

There are numerous advantages to using the techniques for bi-directional communication using LCom variously described herein. One such advantage includes closing the communication loop with an LCom-enabled luminaire, such that information can be transmitted to the luminaire. Although communication loop with LCom-enabled luminaires may be using closed using Bluetooth, Wi-Fi, IR, and direct wired protocols, such communication technologies include challenges as described herein. Using audio-based communication to transmit information to LCom-enabled luminaires is advantageous because audio-based communication does not require a special setup and it is a wireless method of communication. Further, adding microphones to LCom-enabled luminaires is an inexpensive hardware addition as compared to, for example, radio receivers, Wi-Fi modules, or Bluetooth modules. Further still, sending information via audio waves is advantageous because multiple LCom-enabled luminaires can be controlled simultaneously.

LCom-Enabled Luminaire Identification Techniques

As previously noted, existing systems for controlling lighting have drawbacks, such as being time consuming to set up and being unintuitive. For example, smartphone applications exist for controlling specialized hardware to dim lamps. Such a system works by setting up the lamp hardware on a Wi-Fi network and then using the smartphone application to connect to the IP address of the lamp hardware controlling to the controlling application. Once that is established, controlling the lamp dimming level may be performed by dragging a slider up and down on the smartphone screen. However, in a house full of various luminaires, configuring each one with such a system can be time consuming and includes an understanding of Wi-Fi networks and the system as a whole. Furthermore, in such a system, each lamp must be labeled, which causes issues when moving the lamps, particularly when multiple users have access to the smartphone application. There are also drawbacks to other forms of communication, such as IR and Bluetooth. For example, most computing devices do not support IR and IR requires line of sight. Further, Bluetooth has a pairing limitation where only one device can be actively paired with a specific Bluetooth device at a time, limiting control to only one device. Therefore, major challenges exist controlling a lighting system using a computing device (such as a smartphone), including being able to identify which luminaire is to be controlled without requiring the user to: spend a lot of time and effort setting the system up; need a clear understanding of the entire system; create a naming convention that makes sense to all users; or keep track of all luminaire locations.

Thus, and in accordance with some embodiments of the present disclosure, techniques are disclosed for identifying LCom-enabled luminaires. In some cases, the technique includes a luminaire communicating its ID to a computing device (e.g., a smartphone or tablet) via one or more LCom signals. As a result, the computing device can determine exactly which light to control. This can be performed using a smartphone, for example, by aiming the rear-facing image capture device (e.g., rear-facing camera) at the luminaire desired to be controlled. Once the luminaire is in the field of view (FOV), the ID of the luminaire can be determined using one or more LCom signals received from the luminaire. The ID of the luminaire may be, for example, its internet protocol (IP) address, media access control (MAC) address, Wi-Fi address, Bluetooth address, or some other suitable address or identifier, depending upon the communication protocol used by the luminaire or depending upon the given configuration or end-use. Once a luminaire has been identified (e.g., by decoding the ID of the luminaire via its LCom signals), commands can be issued to the luminaire to adjust one or more characteristics of the light output, such as changing the dimming percentage of the light output or changing the color of the light output, for example. This may be achieved by obtaining the ID via LCom and then using the ID to bootstrap or otherwise establish a second wireless communication connection (e.g., Bluetooth, Wi-Fi, or other suitable communication protocol by which the luminaire can receive wireless communications) for transmitting the light control commands. Note in some embodiments that bi-directional communication between the luminaire and the controlling device can also be carried out using an LCom-based protocol, assuming the luminaire is configured with the ability to receive and process light based communications, as provided herein.

Figure 11:
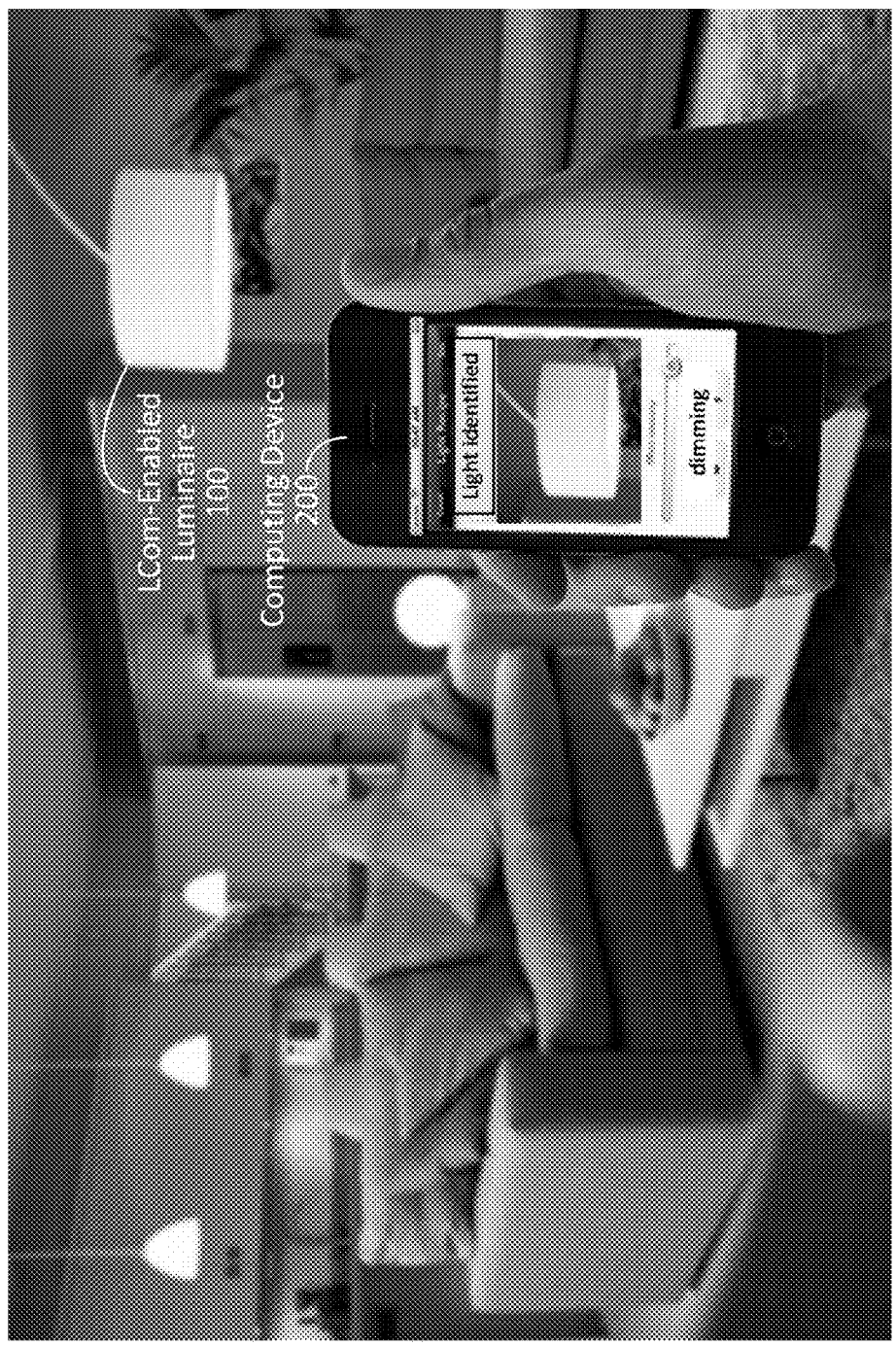
FIG. 11 illustrates an example computing device identifying an LCom-enabled luminaire, in accordance with an embodiment of the present disclosure.

FIG. 11 illustrates an example computing device 200 identifying an LCom-enabled luminaire 100, in accordance with an embodiment of the present disclosure. As shown, a user is holding computing device 200, which in this example case is a smartphone for ease of illustration. Further, the device 200 has a front-facing camera 252 in this example case, which has a FOV that can be seen on the device display 230. As can also be seen, there are other luminaires in the area. In this example embodiment, when the smartphone device 200 reads the ID message transmitted by luminaire 100 via one or more LCom signals, the smartphone application 216 can determine which luminaire 100 is in the FOV (in other words, determine which luminaire ID is being received). Then, a communication protocol (e.g., Wi-Fi, Bluetooth, audio-based communication, etc.) can be used to transmit a command to the luminaire 100. Therefore, LCom can be used to initiate the handshake between the luminaire 100 and the computing device 200 by allowing the device 200 to determine the luminaire 100 ID and thereby know which luminaire to control. As shown on display 230, the user has identified the specific luminaire 100 and can now send commands to it. More specifically, in this example case, the user can use a slide control to adjust the dimming level of the light output from the luminaire 100. Other UI commands are available and numerous variations and configurations will be apparent in light of the present disclosure.

Continuing with the example case in FIG. 11, where there are multiple LCom-enabled luminaires in the area, all of the luminaires may be connected to a local area network (e.g., the luminaires may all be connected to a Wi-Fi router) and each device on the router may be identified by a unique address, such as an IP or MAC address. In such an example case, no two devices ever have the same MAC address. Therefore, if the computing device knows the MAC address of the luminaire to control, which can be obtained via LCom signals transmitted by that luminaire, the device 200 can send a message or command to that MAC address to control that specific luminaire. The routing of the message can be transparent to the user. In terms of messages, they can include any suitable command, such as dimming commands, on/off commands, timed sequences, hue change commands, mode switch commands (e.g., to enter power saving mode, day mode, night mode, etc.), or any other suitable command depending upon the target application or end-use. In some instances, the data packet transmitted via LCom may also include information related to what features the luminaire supports. In some instances, the supported features may be accessible via a lookup table, where the ID of the luminaire 100 can be used with the lookup table to determine what features the luminaire 100 supports. In some such instances, only features able to be adjusted may be accessible via the application 216 being used to control the luminaire 100. A user can use the application 216 to issue a command/message and once the command/message is routed to the luminaire 100, the luminaire 100 can perform the action.

In some cases, where multiple luminaires 100 are in the FOV of a computing device, the techniques may include: the user selecting which luminaire to control; a specific luminaire being automatically selected for control (e.g., the luminaire closest to the computing device); or all luminaires in the FOV being controlled. In some instances, the user may issue a command before identifying the luminaire(s) to control or the user may identify the luminaire(s) to control before issuing command or the user may have the ability to do both (e.g., issue a first command, identify a luminaire to control, the first command is executed by the luminaire, issue a second command, the second command is executed by the luminaire, and so on). In some such instances, where a command is first selected and then one or more luminaires are identified for the purposes of issuing the command, the command may be transmitted to each luminaire identified until the command is deselected or the application is otherwise stopped or exited. A specific case may include a user entering an area with a smartphone, selecting a command from an application on the smartphone configured to control the LCom-enabled luminaires, and then panning throughout the area to place multiple luminaires in the FOV of a camera of the smartphone, thereby causing the command to be sent to the luminaires placed in the camera FOV.

In some cases, groups of luminaires may be controlled. In some such cases, the user could set up the control groups by combining together one or more luminaires in a group. This may be achieved, for example, by panning across the luminaires desired to be in the group when in a learning mode. Once a group is setup, if any of the luminaires in a group are identified (e.g., using the techniques described herein), then the system may be configured to control the entire group together. This may continue until a luminaire is removed from the group, a luminaire is added to another group, and/or the group is ungrouped.

In some cases, luminaires 100 within an area may be mapped out by location to allow a user to remotely control the luminaires. This may be achieved, for example, by initially setting up the location of each luminaire using position information obtained from a computing device 200 and using LCom signals transmitted by the luminaires in the area. In such an example case, the initial set up could be performed by using the ID of each luminaire 100 obtained by LCom signals received by each respective luminaire 100 to efficiently and intuitively add each luminaire to the area mapping. After the initial set up, the user may be able to see a layout of the luminaires in a graphical layout and control the luminaires 100 without having to re-identify each one, thereby allowing more convenient control and control from remote locations (e.g., when physically away from the area or no longer in sight of the luminaires).

There are numerous advantages to using the LCom-enabled luminaire identification techniques variously described herein. The advantages include, but are not limited to: the computing device 200 automatically knows which light is targeted for control; intuitive/natural method of control (e.g., just place the targeted lamp in the FOV of the light sensor or camera); luminaires 100 can be moved without affecting the techniques; no initial communication setup is needed; the techniques work with visitor or guest computing devices 200; and no initial commissioning is required, such as labeling or naming each luminaire.

Techniques for Automatically Calibrating LCom-Enabled Luminaires

As previously noted, systems currently exist for controlling lighting; however, existing systems have undesired drawbacks such as being time consuming to set up and being unintuitive to use. For example in the case of an area including one or more luminaires, to set the lighting in the area using existing systems, users have to manually adjust dimmers, shades, and intensity. Such techniques can lead to uneven lighting if not implemented properly, which can cause hot spots and dark spots throughout the area. Accordingly, such techniques can lead to an unpleasant lighting experience.

Figure 12:
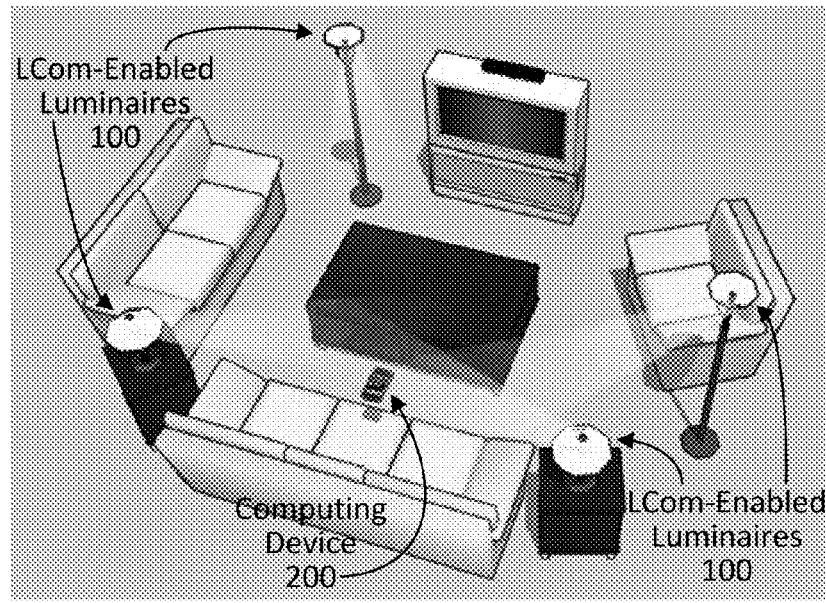
FIG. 12 illustrates using a computing device to automatically calibrate a lighting system, in accordance with an embodiment of the present disclosure.

FIG. 12 illustrates using a computing device 200 to automatically calibrate or otherwise adjust the light output a lighting system, in accordance with an embodiment of the present disclosure. As shown in this example embodiment, the computing device 200 is a smartphone, which is positioned at the eye level of a user sitting on a couch. As is also shown in this example scenario, the lighting system includes four LCom-enabled luminaires 100, each of which is providing light output to create a total light output in the area. In some cases, to auto-calibrate LCom-enable luminaires in an area, the computing device 200 can be used for measuring ambient light. In this manner, the process is comparable to using a microphone for audio calibration of a surround sound system. However, there are differences between auto-calibrating audio and light. In particular, detecting sound in any direction is relatively straight forward, as a microphone is an omnidirectional transducer. In this sense, the field of view (FOV) of a microphone is relatively all-inclusive for a given space. In contrast, light sensors have a more directional FOV and may not be able to capture the entirety of lighting surrounding the light sensor, depending on the location of a given sensor relative to the light sources.

Figure 13:
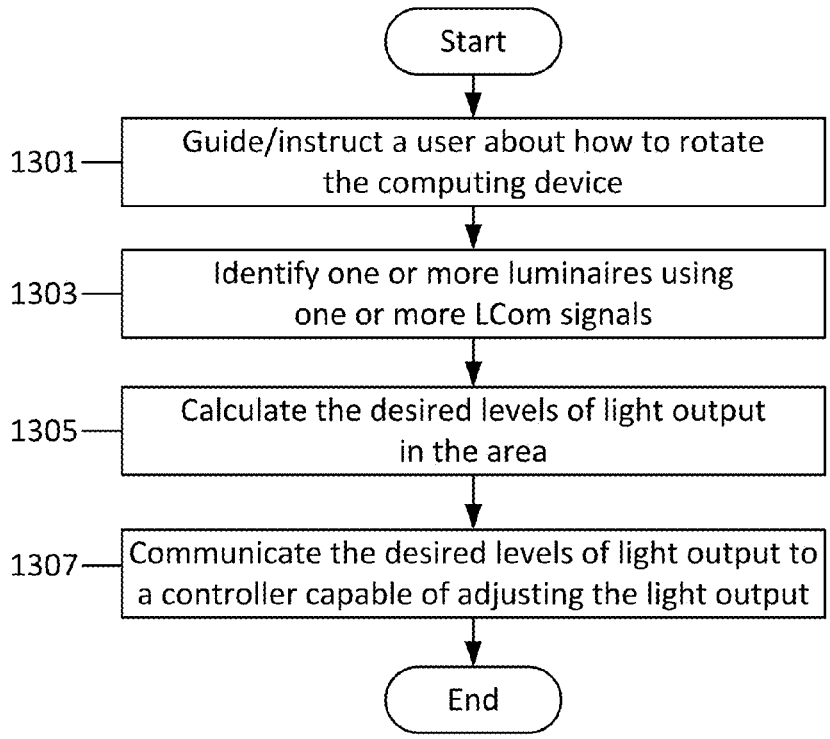
FIG. 13 illustrates an example method of auto-calibrating a lighting system, in accordance with an embodiment of the present disclosure.

Therefore, FIG. 13 illustrates an example method of auto-calibrating or otherwise automatically controlling the light output of a lighting system, in accordance with an embodiment of the present disclosure. The method can be performed in an area including one or more LCom-enabled luminaires 100 and, in this example case, includes the following: guiding and/or instructing 1301 a user about how to rotate the light sensor(s) (e.g., a camera 252, 254 or light sensor 265 of computing device 200); identifying 1303 one or more luminaires 100 using one or more LCom signals; calculating 1305 the desired levels of light output in the area; and communicating 1307 the desired levels to a controller capable of adjusting the light output of the lighting system. Each of these will be described in more detail herein and for ease of description, the computing device 200 and luminaires 100 of FIG. 12 will be used. In addition, the system may include a light control device configured to control the light output of the luminaires 100 based on communication signals received from the computing device 200 and/or the system may be configured such that the computing device 200 can control the luminaires 100 directly, for example. In the case where the computing device can control the luminaires 100 directly, the techniques for bi-directional communication and/or LCom-enabled luminaire identification may be used to facilitate the direct control. In either case, an application 216 running on the computing device 200 can be used to determine and transmit the proper lighting control data to ensure the luminaires are controlled for a given situation. In one specific case, for example, the lighting of a given area is controlled based on the position of the user in that area. The lighting may be further adjusted as the user moves around in that space.

Figure 14:
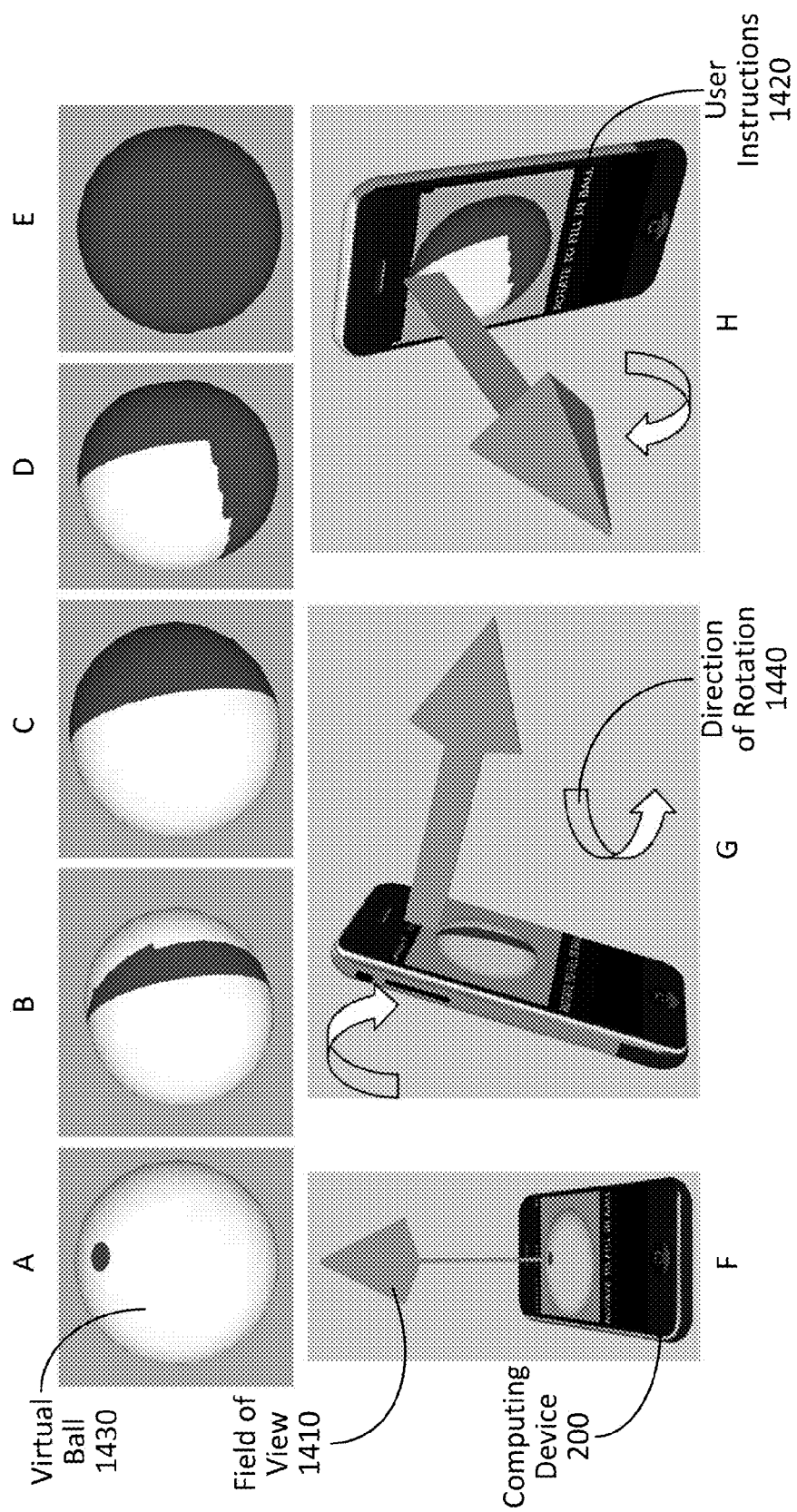
FIG. 14 illustrates an example process for instructing a user about how to rotate computing device to properly capture the ambient light in the area, in accordance with an embodiment of the present disclosure.

In more detail, the method of FIG. 13 includes guiding and/or instructing 1301 a user about how to rotate the computing device 200 which includes a light sensor (e.g., a camera 252, 254 or light sensor 265). The rotating effectively expands the FOV of the sensor thereby allowing the device 200 to capture the ambient light in the area. FIG. 14 illustrates an example user interface and process for instructing a user about how to rotate computing device 200 to properly capture the ambient light in the area, in accordance with an embodiment of the present disclosure. As shown, FIG. 14 includes eight panels, listed as A-H for ease of reference. Panel F shows computing device 200 including a front-facing camera 252 having a field of view (FOV) 1410. Further, computing device in this example includes an application 216 presented on display 230 that includes user instructions 1420 shown that indicate to "rotate to fill in ball", referring to virtual ball 1430. The user instructions 1420 are indicated in Panel H. In this example process, the user has to rotate computing device 200 to capture the entirety of the area in FOV 1410. As the user rotates the device 200, the virtual ball 1430 rotates as well and becomes shaded in that respective portion to indicate the section of the area represented by the portion of the virtual ball 1430 has been viewed or captured. Sensors of the computing device may be used to assist this example process, such as one or more geomagnetic sensors 263, gyroscopic sensors 267, accelerometers 269, or any other suitable sensor, depending upon the configuration of the computing device 200.

Continuing with the example process in FIG. 14, Panel F illustrates the initial FOV 1410 captured by computing device 200, which corresponds to the virtual ball 1430 in Panel A. As shown, only a small portion of the ball 1430 is shaded to indicate that only a small FOV 1410 has been captured at that point. Continuing to Panel G, two directions of rotation 1440 are shown to indicate how the device 200 was rotated to shade the ball 1430 as shown in Panels B and C. Continuing to Panel H, another direction of rotation 1440 is shown to indicate how the device 200 was rotated to shade the ball 1430 as shown in Panels D and E. As shown in Panel E, the entirety of the ball has been shaded, at which point the application 216 presenting this virtual ball 1430 may indicate that the entire area has been viewed, or some other suitable action may occur. In some instances, the entirety of the ball 1430 may not need to be shaded. For example, in some such instances, only 95, 90, 85, 80, or 75%, or some other suitable threshold percentage of the area may need to be viewed/captured to ensure accuracy for this example process. After the process has been completed, one or more of the following may be known: the luminaires 100 in the area; the location of the luminaires 100 in the area; the light output of each luminaire 100 relative to the position of the device 200; the total light output in the area relative to the position of the device 200; and/or other information or data as will be apparent in light of the present disclosure.

The method of the example embodiment shown in FIG. 13 continues with identifying 1303 one or more luminaires 100 using one or more LCom signals. Identifying 1303 may also include identifying where each luminaire is located in the area. As described herein, LCom-enabled luminaires 100 can be identified by their respective IDs. For example, luminaires 100 can use LCom to transmit their IDs to computing device 200. LCom can be transmitted via light output that is pulsed or modulated at a frequency above the perception of the human eye. The pulses form a bit pattern that a light sensor can detect and a computing device 200 can decode. In this case, the bit pattern can include the luminaire ID, which could be, for example, its wireless communication address, IP address, MAC address, Wi-Fi address, Bluetooth address, or some other suitable address or identifier, depending upon the communication protocol used by the luminaire 100 or depending upon the given configuration or end-use. For example, while the user rotates, during 1301, the device 200 at a given location in area being illuminated, IDs of the luminaires 100 can be collected in addition to the light output value(s) and orientation information. Therefore, the source of a light output measurement along with the unique ID received via LCom can inform the device 200 of at least one of the position of one or more luminaires 100 and the proper communication path to those one or more luminaires 100. The following table summarizes data that may be collected during the process of FIG. 14 for use in identifying 1303 luminaires 100 and optionally, their location(s) for the example case of automatically calibrating or otherwise adjusting intensity/luminosity/brightness:

| Data description | Sensor |
| --- | --- |
| Brightness | Light sensor |
| Orientation | Gyroscopic sensor |
| ID | Light sensor or camera using LCom |

The method of FIG. 13 continues with calculating 1305 the desired levels of light output in the area. This can be used to control total light output from the point of view of the user or computing device 200 at a given location, such that all luminaires 100 can be controlled simultaneously. This may be beneficial because individual control of each luminaire 100 can be tedious and time consuming. For example, the user may want to set a desired ambience in the area by instructing the light controller to adjust all of the luminaires 100 simultaneously and not send individual commands to each luminaire 100. By knowing the available luminaires 100 and their respective location or how they are oriented around the computing device 200 (and the user, if one is present), the lighting controller can adjust each luminaire to achieve the desired effect. This can be performed using a fixed process, a smart process, and/or using any suitable techniques as will be apparent in light of the present disclosure. Further note that the desired lighting effect or scheme can be user-configured and arranged in advance (e.g., time-based light schemes, such as dim lighting during Friday night movie time), or inferred by the lighting system (e.g., user is sitting in chair reading so provide high intensity light on chair, while dimming other lights). Using a change in brightness as an example command, a fixed process may include, for example, each luminaire being adjusted in the same manner. For instance, if the user wants 50% brightness level in the area, then each luminaire would be adjusted to 50% output. The relationship between power to the luminaire and output level may not be linear, but in such an example instance, the perceived output of each luminaire would be mapped to the desired brightness level in a linear fashion. Alternatively, the brightness of lighting can effectively follow the user as he or she moves around the room, thereby automatically dimming other locations in the room where the user is not present. In one such case, device 200 may be a wearable device such that the user does not need to hold or otherwise command the device; rather, in such example embodiments the device 200 may be configured as an 'always-on' device that, once turned-on and deployed, actively senses lighting output in the room and executes an automatic lighting control function based on data received from the various sensors of the deployed device. Further note that the light sensors in such an embodiment may be distributed so as to provide an all-inclusive or otherwise wide FOV. In another case, the room, hallway, or area that the user is moving through may include one or more sensors (e.g., light sensors, image sensors, motion sensors, etc.) throughout the area that detect the motion of the user and adjust the light output in the area (or in other areas) based on that motion. For example, if a user was walking down a hallway, sensors in the hallway may be configured to detect the user and increase light output in the upcoming sections of the hallway based on the direction and speed of the user. Further, the system may be configured to turn on lights in upcoming rooms as the user walks through the hallway.

Continuing with the change in brightness example command, a smart process may include, for example, taking into account the spacing and position of each luminaire when changing the brightness level. For instance, if luminaires 100 are spaced tightly together in one part of the area compared to another, then just the amount and distribution of the luminaires will make one part of the area brighter than the other even if all luminaires 100 were set to the same brightness value. This issue can be resolved in a number of ways. One such example way is to test a luminaire while observing its ID by, for example, adjusting the brightness of the light output of the luminaire up and down to see the resulting effect. Observing the range of LCom can accomplish the same effect, though, as the pulse can span from off to full on. The purpose in this example case may be to observe how each luminaire 100 contributes to the overall luminance of the environment from the point of view of the observer. If multiple luminaires 100 are close together and they all contribute significantly to the luminance level, then they may have to be adjusted to a lower extent than more spaced out luminaires, for example. Another way of observing the contribution from different luminaires 100 is to capture additional information about the position of the luminaires 100. For example, the position of a luminaire may be transmitted via LCom and/or it may be calculated during the identification 1301 process. This can help the computing device 200 know where each luminaire 100 is located relative to the device 200 and thus calculating the light output provided by each luminaire 100 in the area may be performed using any suitable customary techniques. Likewise, readings on the luminaires 100 from different positions in the area can help with the accuracy of positioning each luminaire using, for example, triangulation to estimate the positions.

In addition, other advanced settings would include setting regions of brightness. For instance, the user might want to read a book while watching television. Therefore the region near the television may be desired to be dimmed to, for example, reduce glare, while the nearby region may be desired to be brighter for better visibility of the book. In such an example instance, the user interface may include suggested zones for which the computing device 200 assigns luminaires 100. Further, in such an example instance, the user would not need to choose individual luminaires to control, but could choose regions or zones to control. Control of individual luminaires may still be available, for example, but the zones may allow the user the capability to achieve a particular global goal quicker than if only individual control of luminaires 100 were available. In some instances, presets may be added where a user can assign labels to certain configurations. In the example of wanting to read a book while watching television, the user may assign a custom label or name for the configuration, such as "reading preset". Further, individual controls could be added to the configuration, such as being able to specify the brightness of one luminaire (e.g., the luminaire over the reading spot). Such presets could also be shared across users and devices, for example. Moreover, presets could be merged together for a compromise between multiple users. For instance, a first user may be sitting on a couch with the lighting preset to a reading configuration, while a second user may be sitting on a couch with the lighting preset to a television watching configuration. In such an example instance, the lighting controller may merge the two preset requests into a compromise setting that includes aspects of both preset configurations.

The method of FIG. 13 continues by communicating 1307 the desired levels of light output to a controller capable of adjusting the light output. As previously described, the controller may be a centralized controller capable of controlling all of the luminaires 100 in an area and/or luminaires may include individual controllers. Therefore, in some instances, the computing device 200 may communicate commands directly to one or more luminaires 100. In some such instances, a processor 220 and/or controller 270 of the computing device 200 may be configured to perform the smart processes described above with reference to calculations 1305. Communication 1307 may be performed using any suitable techniques, such as using audio-based commands as described herein for the bi-directional communication techniques for LCom systems.

Numerous variations on the methodology of FIG. 13 will be apparent in light of this disclosure. As will be appreciated, and in accordance with some embodiments, each of the functional boxes (e.g., 1301, 1303, 1305, 1307) shown in the figure can be implemented, for example, as a module or sub-module that, when executed by one or more processors or otherwise operated, causes the associated functionality as described herein to be carried out. The modules/sub-modules may be implemented, for instance, in software (e.g., executable instructions stored on one or more computer readable media), firmware (e.g., embedded routines of a microcontroller or other device which may have I/O capacity for soliciting input from a user and providing responses to user requests), and/or hardware (e.g., gate level logic, field-programmable gate array, purpose-built silicon, etc.). In some embodiments, a non-transitory computer program product encoded with instructions that, when executed by one or more processors, causes a process to be carried out, the process comprising the methodologies of FIG. 13.

An alternative approach to the techniques for auto-calibrating LCom-enabled luminaires described herein may include adjusting light levels manually, such as by hand. However, such an alternative may be inconvenient and lead to a diminished user experience. Another alternative includes using a computing device with a light sensor and/or camera that has a large enough FOV such that most or all of the luminaires and/or their respective light output are captured quickly. In such an example case, the light controller can optimize the light levels for a moving person. For instance, the user can simply have their smartphone facing towards the ceiling and capture light sources in real time. Using this information, the luminaires would update light levels to reflect the changing position. A good example of this would be a user reading their smartphone while moving around the house. The user may want the luminaires in reading mode, which may include the ambient light level being kept at a low level except for the luminaires close to the reader. Wherever the user travels, the nearest luminaire would be at a higher level compared to surrounding ones. An alternative to the user physically rotating the computing device 200 to collect data may include automatic methods where the device 200 rotates and moves itself to perform the detection techniques described herein. An example application may include the device 200 vibrating, where the vibration causes the device 20 to spin around in place. Another example would be to use a motorized stand or if an automated robot (capable of being moved) included device 200 or had the same capabilities.

There are numerous advantages to using the techniques for auto-calibrating LCom-enabled luminaires variously described herein. The advantages include, but are not limited to: providing a pleasant lighting experience; increasing safety by reducing or eliminating dark spots in an area; producing calibration data that can feed back into an AV device for use with controlling lighting; setting the light output using different modes; and including automated 360° panorama scanning capabilities for LCom-enabled luminaires. In addition, the techniques provide a convenient method for automatically adjusting light output based on particular seating locations or characteristics of a given space.

Techniques for Controlling a Lighting System Using LCom

As previously noted, there is a need for improvement in controlling the lighting in an area, especially for AV applications. For example, users currently do not have the choice to control lighting in an area in the way that they have the ability to control display device configurations and sound system configurations, leading to a diminished user experience. Ambient light can have a major effect on a viewer's experience of a visual presentation, which might include movies, video games, slide shows, or computer work, just to name a few examples. While the viewing experience is subjective, allowing a user to have choices that are optimized for a certain function is desirable. For example, audio and video systems allow users to choose between various modes (e.g., game, music, movie, etc.) and in some instances, the mode or configuration changes automatically. However, without the ambient light adjusting as well, the effect is not fully realized. Although users may be able to manually control ambient light output, it is typically very limited (e.g., determining whether to turn certain lights on or off), inconvenient, and substandard.

Thus and in accordance with some embodiments of the present disclosure, techniques are disclosed for controlling a lighting system using LCom. In some cases, the techniques include dynamically controlling the lighting system, such as providing surround lighting by dynamically controlling the luminaires in a room to adjust the ambient light output based on one or more factors, as will be described in more detail herein. In some such cases, the light controller(s) may need to know the luminaires in an area and their position within that area. Area, as used herein, may include any space, such as an area, multiple areas, an outside space, an entire house or building, multiple houses or buildings, etc. The position of each luminaire can be determined using the techniques variously described herein, for example, such as the techniques for automatically calibrating a lighting system including LCom-enabled luminaires and the techniques for identifying an LCom-enabled luminaire. For example, the position of each luminaire may be determined using a combination of external sensors and LCom. As previously mentioned, the external sensor may be a camera, a smart occupancy sensor that can track specific movements (e.g., sensors that use an array of pixels), a motion sensing device (e.g., a Microsoft Kinect, a PlayStation Eye or PlayStation Camera, etc.), or any other suitable device(s) as will be apparent in light of this disclosure. In some cases, the external sensor may be integrated in the light controller. Once the external sensor registers the position of a luminaire in the area, the external sensor can identify the luminaire from the ID transmitted by the luminaire via one or more LCom signals.

Once all of the luminaires in a given area are identified and their respective positions are determined, the light controller can independently control all of the luminaires. The light controller may be a computing device (e.g., computing device 200 as variously described herein), such as a smartphone, tablet, smart television, AV device, media device, video game console, or a dedicated light controller device, for example. In some cases, the communication protocol used to control the luminaires may dictate the type of light controller device needed. Controlling the luminaires can be achieved using any wired or wireless system, and in some cases, the luminaires may be controlled using the bi-directional communication techniques for LCom systems variously described herein. Each LCom-enabled luminaire may be controlled using commands issued by a user or provided by some other suitable method (e.g., commands issued in response to a stimulus, such as the time of day changing, the brightness outside hitting a certain threshold, etc.). Various different characteristics of each luminaire and/or the light output therefrom may be controlled, such as the brightness or hue of the light output. There are a number of cases where dynamic adjustment of the ambient light in an area can increase the user experience, such as: increasing ambient light when video is paused to allow users to move through the area safely; decreasing ambient light during a scary or suspenseful scene of a video; increase ambient light for video game playing to avoid eye strain but decrease the ambient light during pre-animated sections; decrease ambient light during low contrast scenes but increase the ambient light during bright scenes; creating visual effects to enhance video content, such as flashing lights when lightning is displayed in a movie; and providing a spotlight when a remote control is raised by a user to illuminate the remote.

Figure 15A:
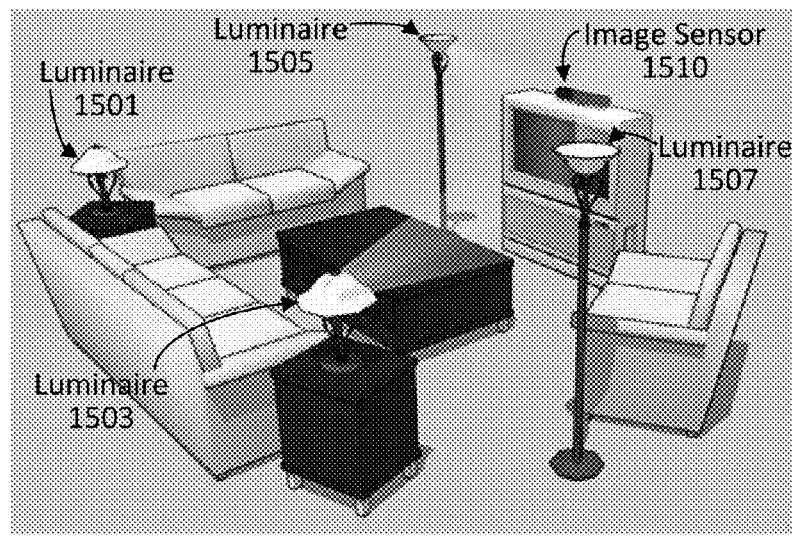
FIGS. 15A-B illustrate an example system including four LCom-enabled luminaires and an image sensor, in accordance with an embodiment of the present disclosure.
Figure 15B:
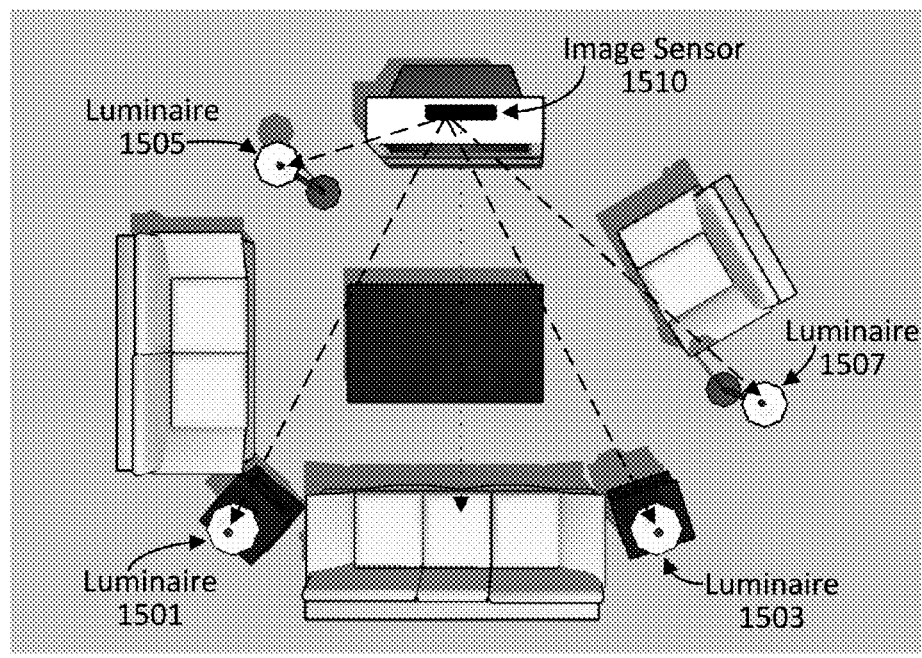

FIGS. 15A-B illustrate an example system including four LCom-enabled luminaires 1501, 1503, 1505, 1507 and an image sensor 1510, in accordance with an embodiment of the present disclosure. More specifically, FIG. 15B illustrates the overhead view of the area in FIG. 15A (which in this example case, is a room, such as a living room, as can be seen). The LCom-enabled luminaires 100 are identified as 1501, 1503, 1505, and 1507 for ease of reference and to also indicate that each luminaire 100 has its own ID. The image sensor 1510 in this example embodiment may be a motion sensing device (such as a Microsoft Kinect), for some applications, as will be discussed herein. The system may also include one or more lighting controllers, which may be located in or otherwise operatively coupled to one or more of the luminaires, the image sensor 1510, and/or a computing device 200 (e.g., a smartphone, AV device, media player, video game console, etc.).

The light control techniques may include an initialization process, which may include observing the luminaires 1501, 1503, 1505, 1507 in the FOV of image sensor 1510 and calculating their approximate position from the image sensor 1510. For example as shown in FIG. 15B, the luminaires are located from the image sensor 1510 via the dashed lines leading to each luminaire. The initialization process may also include establishing communication with the luminaires by detecting and decoding LCom signals that include IDs for the luminaires. For ease of reference, the IDs will be the same as the numbers that identify each luminaire in FIGS. 15A-B (1501, 1503, 1505, 1507). The initialization process may also include identifying additional luminaires which may be out of the field of view (FOV) of image sensor 1510. This may be performed, for example, by querying for more luminaires within the same area or within a certain proximity (e.g., using an area ID or location retrieved via LCom), which may be obtained via a local area network, for example. In the example case shown in FIG. 15B, if luminaire 1505 was outside of the FOV of image sensor 1510, then the locations of luminaires 1501, 1503, and 1507 may be used in combination with knowing (e.g., via LCom signals received from luminaires 1501, 1503, and 1507) that luminaire 1505 is also in that area to identify the position of luminaire 1505. The initialization process may also include commanding each luminaire to go through a range of brightness and hue levels to measure the effects on the area, for example. Such information may also be computed based on information about the specific luminaire using, for example, the luminaire ID to look up additional information (e.g., via cloud storage or the Internet).

Once the luminaires 100 of a lighting system in a given area are identified by location and the method of control of each luminaire 100 is determined, the lighting system can be manually or automatically controlled in a number of different ways. For example, the luminaires in a given area and/or the light output therefrom may be controlled manually as variously described herein. Manual control may include control of individual luminaires, groups of luminaires, or all of the luminaires within the area. In some instances, control commands may be issued via gestures, such as hand motions performed by a user. For example, image sensor 1510 of FIG. 15A-B may be a motion sensing device (such as a Microsoft Kinect) and the motion sensing device may be configured to identify certain hand gestures that are assigned to light control commands or light control menu navigation. Note that such gestures may be hard-coded or user-configurable, or some combination thereof. In some instances, control commands may be issued via a GUI of a computing device 200. For example, a computer program product, such as a smartphone or tablet application, may be installed on the computing device 200, which may allow the user to issue light control commands in any number of suitable ways.

Another example light control application may include adjusting the luminance in an area for safety reasons. For example, as image sensor 1510 is tracking the location of the luminaires 100, it can also track motion within the area. If the sensor 1510 detects someone is moving out of their seat while watching a movie, the system may be configured to increase the brightness of the room to allow the person to safely move around the room. Once the person has left the room, the light output can return back to the mode it was in. Furthermore, once the person is detected coming back into the room, the light output can increase again. The level that the light output increases to could be a preset or set by the user, or a combination thereof.

Another example light control application may include setting the proper ambiance for optimal picture quality. For example, most video displays (e.g., televisions, projectors, etc.) are rated for a particular contrast ratio which is the difference in luminance from the darkest output possible to the lightest output possible. For projectors, this is highly dependent on the ambient light. A lot of or even all of the dark detail in a dark scene is lost if ambient light reaches the screen. For televisions where the screen size is not as large, very bright scenes in a dark room can be very harsh on the eyes. Knowing the display type and scene content, the light controller can adjust the ambient light for optimal conditions. For instance, playing a movie through a video game console or media device, the device may know the content of the scene. If a dark scene is detected, the light controller may be configured to dim the lights or at least the lights that would shine on the display device, such as spot lights aimed at the screen. Further, with hue control, colors can take on a different perceived hue when exposed to different color temperatures of light. Likewise, the feeling of a scene of a movie can be different due to the ambient light. Given that it is possible to change the ambient color of the room, media creators such as movie makers can dictate the best hue of the ambient light to enhance the picture on the screen. For instance, a sunny scene on a television may be enhanced by a warm (e.g., a substantially red) ambient light. In another instance, a horror scene might want a cold (e.g., a substantially blue) ambient light to enhance the tone of the scene.

Another example light control application might include expanding the visual effects of video or audio into an area by adjusting the ambient light in the area. For example, as surround sound can greatly enhance the audio experience, surround light can enhance the visual experience. Media devices have been getting more connected and intelligent over time, such as including capability to access content on cloud storage or the Internet (e.g., via a Wi-Fi-based connection). This means that complementary content can be streamed to such devices. Therefore, such devices may be configured to download a light program along with the actual movie content. Such a light program may contain simple timing cues, such as at the time count of 1:20 minutes into the movie, flash the lights to simulate lightning, for example. The light controller may read the light program and determine how to best execute the desired effects based on the lighting system set up in the area. Therefore, in some such cases, the light controller may have to extrapolate and/or calculate the best light control commands to issue based on the light program and the known lighting system.

Another example light control application may include independent lighting for focused tasks. For example, image sensor 1510 may be configured to track controllers and other objects in space to provide illumination on the specific object. One example scenario might involve someone operating a remote control to control a television. In such an example scenario, the image sensor 1510 may determine that the television remote has been raised and the area where it has been raised may be illuminated or the remote itself may be illuminated using a spotlight, for example. This application can be extended to mobile computing device usage (e.g., smartphone, tablet, laptop, etc.), books, or any object that could benefit from increased (or even decreased) luminance when being used. Once the object is done being used, the system may be configured to return the luminaire(s) to the normal levels based on, for example, the set mode.

Figure 15C:
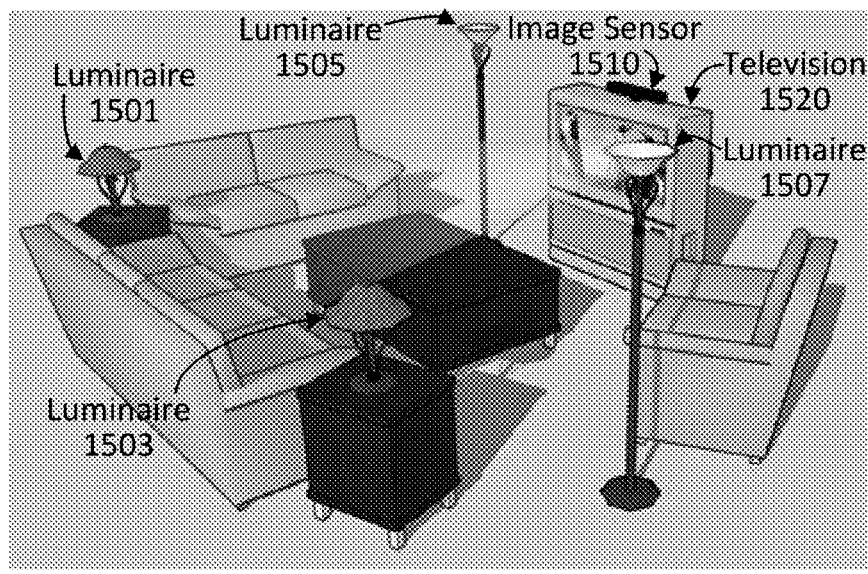
FIG. 15C illustrates the example system of FIGS. 15A-B demonstrating an example lighting control technique using LCom, in accordance with an embodiment of the present disclosure.

FIG. 15C illustrates the example system of FIGS. 15A-B demonstrating an example lighting control technique using LCom, in accordance with an embodiment of the present disclosure. The example lighting control technique shows an example where the media player is playing a movie on television 1520. In this example case, as the displayed scene is bright, the front luminaires (1505 and 1507) turn on to supplement the brightness of the scene, as is the particular case in FIG. 15C. Further, the system is configured to turn off the rear luminaires (1501 and 1503) during the bright scene to reduce the glare on television 1520, as is also shown in FIG. 15C (for example, compare to the situation in FIGS. 15A-B where all luminaires are turned on). Such an example lighting control technique may be automatically performed based on the movie content, in this example case. However, the system may be configured to allow the user to manually override the automatic mode and to set a specific preset mode, such as a movie, gaming, or casual mode, causing the luminaires to adjust accordingly. Such light control input may be provided via hand gestures or input through a video game controller or computing device 200 GUI (such as a smartphone application 216), for example, depending upon the specific configuration of the system. Continuing with the movie example in FIG. 15C, the system may be configured to, after the movie is over, adjust the total light output in the area to a comfortable ambient level based on the time of day or the natural light outside.

Although the techniques for light control can be achieved using the bi-directional communication techniques described herein (e.g., LCom from luminaire to AV device and audio-based communication from AV device to luminaire), as previously described, other communication technologies may be used for one or both of the communication directions. Such other technologies include wired options, short-range wireless options (e.g., Bluetooth or IR), local area wireless options (e.g., Wi-Fi), or other suitable communication technologies. There are numerous advantages of using the light control techniques variously described herein, including, but not limited to: improving area luminance for safety purposes; achieving proper ambience for optimal picture quality; expanding visual effects into the area by adjusting ambient lighting; using independent lighting for focused tasks; using hand motions to control lighting; and auto-commissioning luminaires using LCom. Additional benefits of the techniques will be apparent in light of this disclosure.

Numerous embodiments will be apparent in light of this disclosure. One example embodiment provides a system including: one or more luminaires, each luminaire including at least one solid-state light source configured to output light, and a modulator configured to modulate the light output to allow for emission of light-based communication (LCom) signals; a light sensor configured to detect the LCom signals; a computing device operatively coupled to the light sensor and configured to decode data from the LCom signals; and a controller configured to control the light output from at least one of the luminaires. In some cases, the LCom signals are provided via light output from the luminaire and wherein the total light output is configured to be maintained at a relatively constant level, such that the light output variance is not perceptible by human vision. In some cases, the light sensor is embedded in the computing device. In some cases, each luminaire includes an audio input device configured to detect ambient audio-based communication signals, wherein the audio-based communication signals include data for controlling at least one of the luminaires. In some such cases, the controller is configured to control the light output from at least one of the luminaires based on at least one of ambient playback of video and audio content. In some such cases where each luminaire includes an audio input device configured to detect ambient audio-based communication signals, at least one acknowledgment signal is used to verify at least one of transmission and receipt of an audio-based communication signal. In some cases, the system includes an audio output device configured to transmit audio-based communication signals during a time period based on a synchronization signal, the synchronization signal determined based on the LCom signals. In some cases, at least one of the position and identification of each luminaire is determined based on LCom signals received from each respective luminaire. In some cases, the light output and LCom signals received from each luminaire can be used to calibrate the total light output by the system. In some cases, the controller controls all of the luminaires in the system. In some cases, the controller is configured to control the light output from at least one of the luminaires based on at least one of ambient playback of video and audio content. In some cases, the controller is configured to control the light output from at least one of the luminaires based on information received from at least one of the light sensor, an image sensor, a motion sensing device, a remote controller device, and a mobile computing device. In some cases, the controller is configured to control the light output based on commands transmitted over a wireless communication link. In some cases, the computing device is one of a smartphone, tablet, audiovisual (AV) device, media player, and video game console. In some cases, the computing device includes a user interface, wherein the user interface is configured to guide a user in a process of moving the light sensor at a given position of an area to determine total light output levels in the area. In some cases, the total light output levels in the area are used to control the light output from at least one of the luminaires.

Another example embodiment provides a method including: receiving light-based communication (LCom) signals from one or more luminaires, the LCom signals including data that can be used to determine at least one of a unique identifier of at least one luminaire, a position of at least one luminaire, and timing information that can be utilized to communicate back to at least one luminaire; and transmitting communication signals that include information for controlling light output from at least one of the luminaires. In some cases, the LCom signals are provided via light output from the luminaire and wherein the total light output is configured to be maintained at a relatively constant level, such that the light output variance is not perceptible by human vision. In some cases, the communication signals are ambient audio-based communication signals. In some cases, the method includes adjusting the light output from the at least one luminaire based on the communication signals. In some cases, the communication signals include information for simultaneously controlling a plurality of luminaires. In some cases, the method includes measuring light output levels of each of the one or more luminaires to calibrate the total light output from all of the luminaires. In some cases, the information related to controlling the light output is based on at least one of: video content; audio content; data received from a sensor; data received from a remote controller device; data received from a computing device; and data received from an audiovisual (AV) device.

Another example embodiment provides a non-transitory computer program product comprising a plurality of instructions non-transiently encoded thereon that, when executed by one or more processors, cause a process to be carried out. The computer program product may include one or more computer-readable mediums, such as, for example, a hard drive, compact disk, memory stick, server, cache memory, register memory, random-access memory (RAM), read-only memory (ROM), flash memory, or any suitable non-transitory memory that is encoded with instructions that can be executed by one or more processors, or a plurality or combination of such memories. The process includes: receive light-based communication (LCom) signals from one or more luminaires, the LCom signals including data that can be used to determine at least one of a unique identifier of at least one luminaire, a position of at least one luminaire, and timing information that can be utilized to communicate back to at least one luminaire; and transmitting communication signals that include information for controlling light output from at least one of the luminaires.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A system comprising:
one or more luminaires, each luminaire comprising:
at least one solid-state light source configured to output light;
a modulator configured to modulate the light output to allow for emission of light-based communication (LCom) signals, wherein the LCom signals are configurable; and
an audio input device configured to detect ambient audio-based communication signals, wherein the audio-based communication signals comprises data for controlling at least one of the luminaires embedded in an audio stream;
an audio output device configured to transmit the audio-based communication signals during a time period based on a synchronization signal, the synchronization signal determined based on the configurable LCom signals;
a light sensor configured to detect the configurable LCom signals;
a computing device operatively coupled to the light sensor and configured to decode data from the configurable LCom signals; and
a controller configured to control the light output from at least one of the luminaires.

2. The system of claim 1, wherein the configurable LCom signals are provided via light output from the luminaire and wherein the total light output is configured to be maintained at a relatively constant level, such that the light output variance is not perceptible by human vision.

3. The system of claim 1, wherein the light sensor is embedded in the computing device.

4. The system of claim 1, wherein the controller is configured to control the light output from at least one of the luminaires based on data embedded in at least one of ambient playback of video and audio content.

5. The system of claim 1, wherein at least one acknowledgment signal is used to verify at least one of transmission and receipt of the audio-based communication signals.

6. The system of claim 1, wherein at least one of the position and identification of each luminaire is determined based on configurable LCom signals received from each respective luminaire.

7. The system of claim 1, wherein the light output and the configurable LCom signals received from each luminaire can be used to calibrate the total light output by the system.

8. The system of claim 1, wherein the controller controls all of the luminaires in the system.

9. The system of claim 1, wherein the controller is configured to control the light output from at least one of the luminaires based on information received from at least one of the light sensor, an image sensor, a motion sensing device, a remote controller device, and a mobile computing device.

10. The system of claim 1, wherein the controller is configured to control the light output based on commands transmitted over a wireless communication link.

11. The system of claim 1, wherein the computing device is one of a smartphone, tablet, audiovisual (AV) device, media player, and video game console.

12. The system of claim 1, the computing device further including a user interface, wherein the user interface is configured to guide a user in a process of moving the light sensor at a given position of an area to determine total light output levels in the area.

13. The system of claim 12, wherein the total light output levels in the area are used to control the light output from at least one of the luminaires.

14. A method comprising:
receiving light-based communication (LCom) signals from one or more luminaires, wherein the LCom signals are configurable to include data that can be used to determine at least one of:
a unique identifier of at least one luminaire;
a position of at least one luminaire; and
timing information that can be utilized to communicate back to at least one luminaire; and
transmitting communication signals that include information for controlling light output from at least one of the luminaires, wherein the communication signals comprises ambient audio-based communication signals that includes data for controlling at least one of the luminaires embedded in an audio stream and wherein the audio-based communication signals are transmitted during a time period based on a synchronization signal, the synchronization signal determined based on the LCom signals.

15. The method of claim 14, wherein the LCom signals are provided via light output from the luminaire and wherein the total light output is configured to be maintained at a relatively constant level, such that the light output variance is not perceptible by human vision.

16. The method of claim 14, further comprising adjusting the light output from the at least one luminaire based on the communication signals.

17. The method of claim 14, wherein the communication signals include information for simultaneously controlling a plurality of luminaires.

18. The method of claim 14, further comprising measuring light output levels of each of the one or more luminaires to calibrate the total light output from all of the luminaires.

19. The method of claim 14, wherein the information related to controlling the light output is based on at least one of:
video content;
audio content;
data received from a sensor;
data received from a remote controller device;
data received from a computing device; and
data received from an audiovisual (AV) device.

* * * * *